(12) United States Patent
Hsieh et al.

(10) Patent No.: US 12,019,212 B2
(45) Date of Patent: Jun. 25, 2024

(54) OPTICAL IMAGING LENS

(71) Applicant: Genius Electronic Optical (Xiamen) Co., Ltd., Fujian (CN)

(72) Inventors: Hung-Chien Hsieh, Taichung (TW); Qingzhi Zhu, Fujian (CN); Fensha Cai, Fujian (CN)

(73) Assignee: Genius Electronic Optical (Xiamen) Co., Ltd., Fujian (CN)

( * ) Notice: Subject to any disclaimer, the term of this patent is extended or adjusted under 35 U.S.C. 154(b) by 0 days.

(21) Appl. No.: 17/960,829

(22) Filed: Oct. 6, 2022

(65) Prior Publication Data

US 2023/0087037 A1 Mar. 23, 2023

Related U.S. Application Data

(63) Continuation of application No. 16/798,438, filed on Feb. 24, 2020, now Pat. No. 11,500,181, which is a continuation of application No. 15/997,703, filed on Jun. 5, 2018, now Pat. No. 10,613,296.

(30) Foreign Application Priority Data

Mar. 19, 2018 (CN) .......................... 201810222728.7

(51) Int. Cl.
*G02B 13/00* (2006.01)
*G02B 9/58* (2006.01)
*G02B 27/00* (2006.01)

(52) U.S. Cl.
CPC ............. *G02B 13/004* (2013.01); *G02B 9/58* (2013.01); *G02B 27/0037* (2013.01)

(58) Field of Classification Search
CPC ..... G02B 13/004; G02B 9/58; G02B 27/0037
USPC .................................. 359/715, 753, 771, 772
See application file for complete search history.

(56) References Cited

U.S. PATENT DOCUMENTS 9,541,735 B2 1/2017 Yonezawa
2010/0073779 A1* 3/2010 Wang .................. G02B 13/004
359/772

FOREIGN PATENT DOCUMENTS

| JP | 5973240 | 8/2016 |
| TW | I504927 B | 10/2015 |
| TW | I612356 B | 1/2018 |

* cited by examiner

*Primary Examiner* — William Choi
(74) *Attorney, Agent, or Firm* — Winston Hsu

(57) ABSTRACT

An optical imaging lens includes a first lens element, a second lens element, a third lens element and a fourth lens element. The first lens element has negative refracting power, the periphery region of the object-side surface of the second lens element is concave and the optical-axis region of the object-side surface of the third lens element is concave. The Abbe number of the first lens element is υ1, the Abbe number of the second lens element is υ2, the Abbe number of the third lens element is υ3 and the Abbe number of the fourth lens element is υ4 to satisfy υ1+υ2+υ3+υ4≤150.000.

20 Claims, 34 Drawing Sheets

Longitudinal spherical aberration

Sagittal field curvature

Tangential field curvature

Distortion

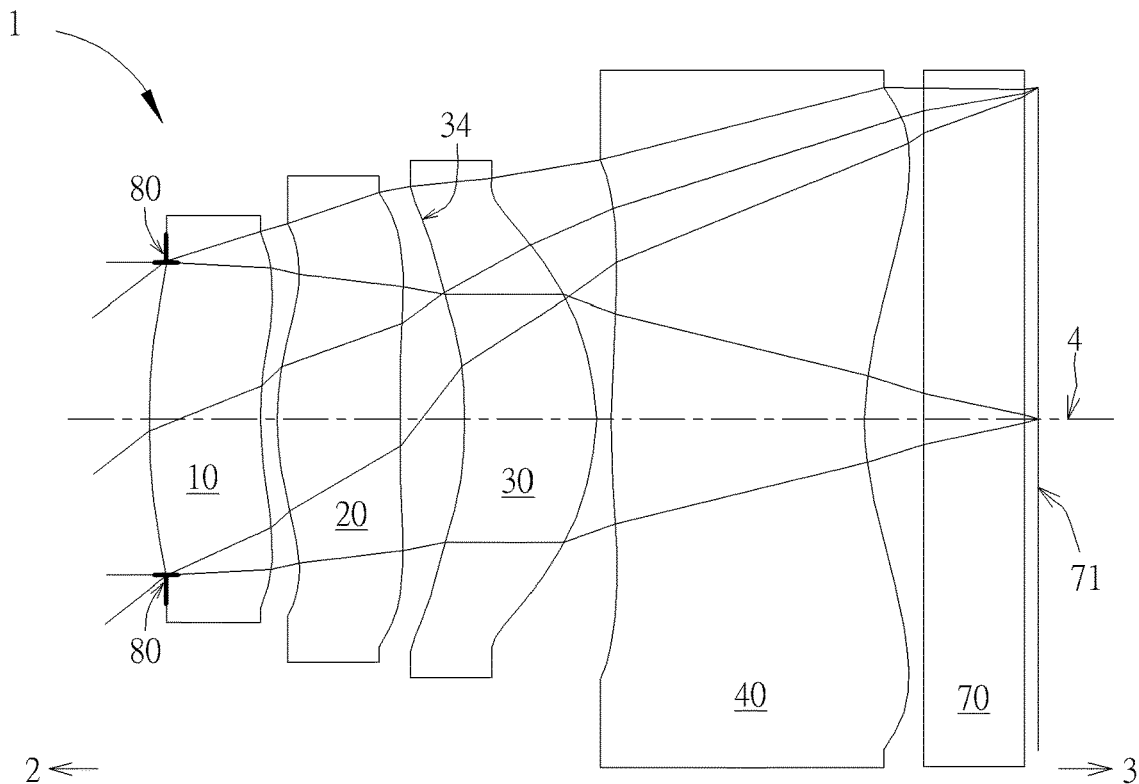
FIG. 12
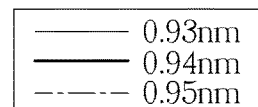
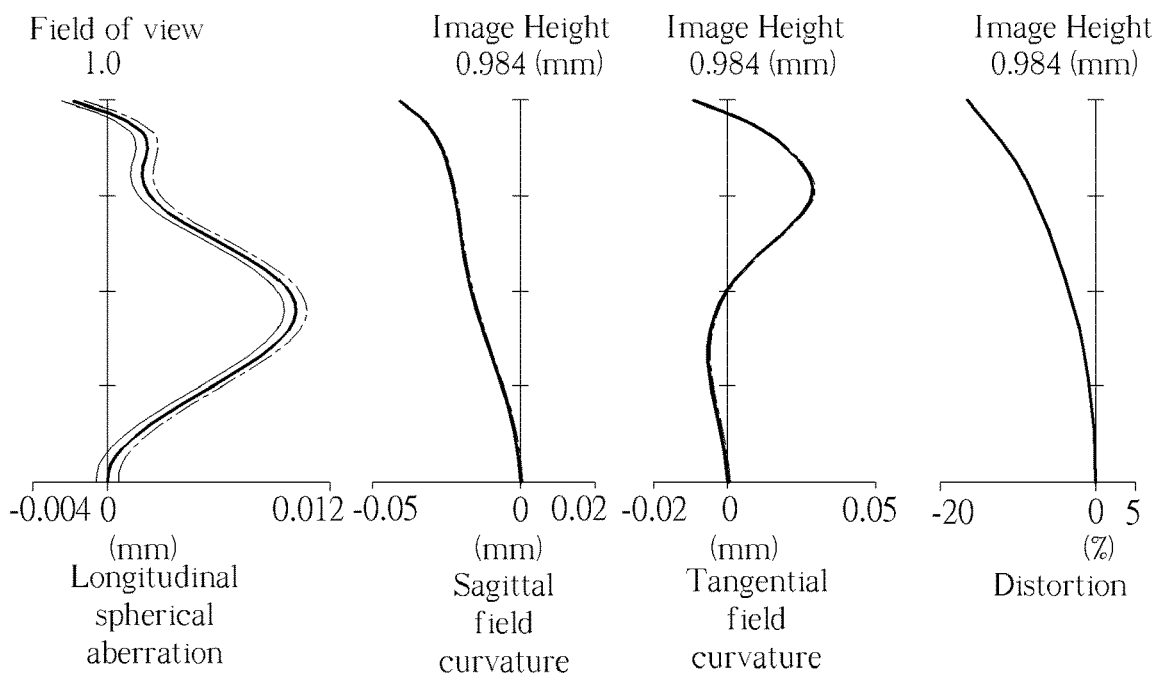
FIG. 13A   FIG. 13B   FIG. 13C   FIG. 13D

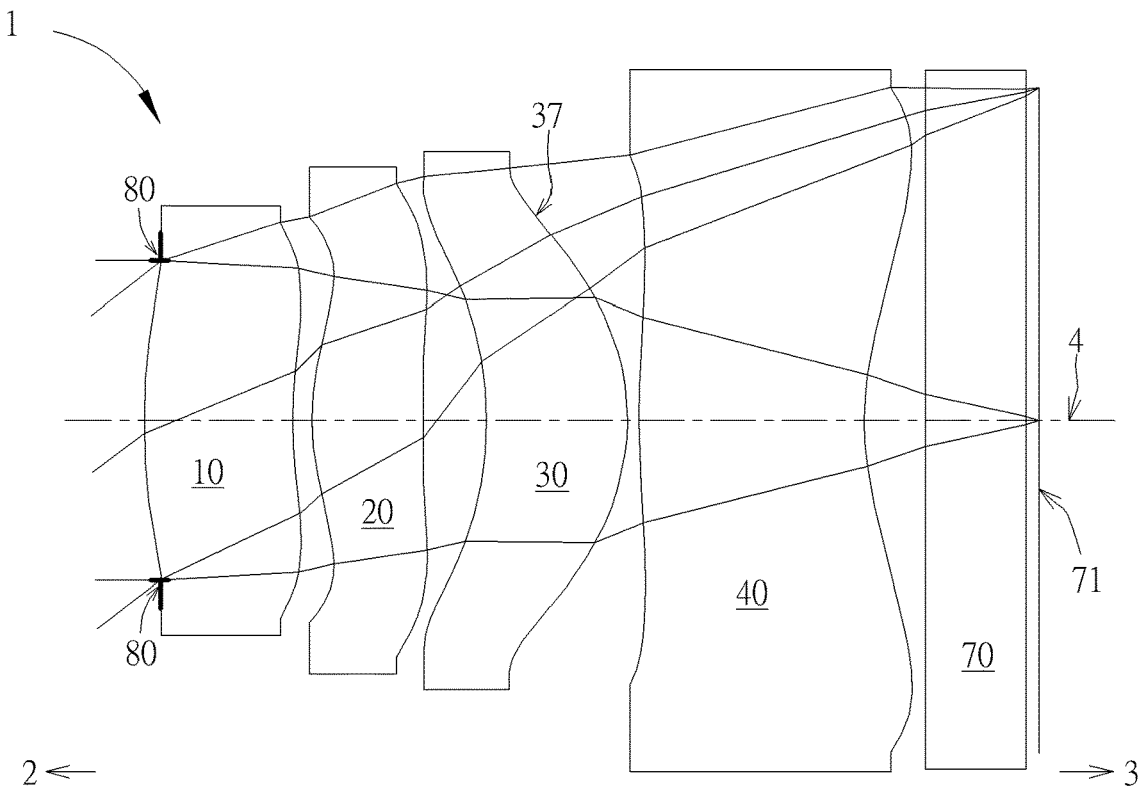
FIG. 18
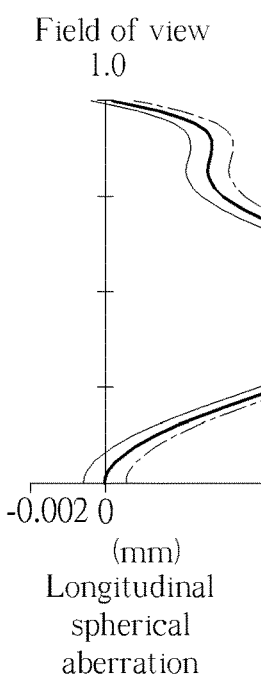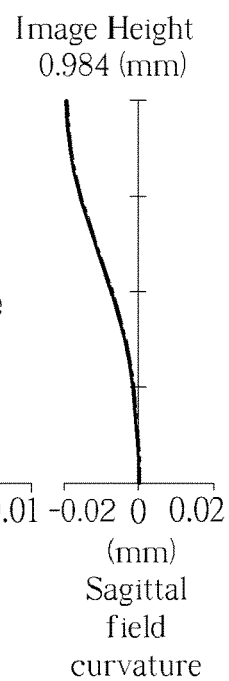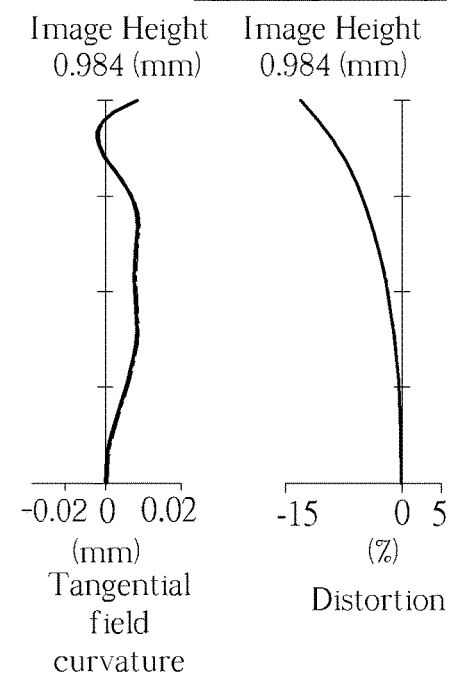
FIG. 19A    FIG. 19B  FIG. 19C  FIG. 19D

| First Embodiment |||||||
|---|---|---|---|---|---|---|
| EFL=1.440mm, HFOV=37.500 Degrees, TTL=2.737mm, Fno=1.526, IMH=0.979mm |||||||
| No. | Radius | Ape. Stop Lens Thickness Air Gap | | Refractive Index | Abbe No. | Focus |
| | Object | INFINITY | INFINITY | | | |
| 80 | Ape. Stop | INFINITY | -0.040 | | | |
| 11 | First Lens | 1.426 | 0.371 | T1 | 1.661 | 20.374 | -6.150 |
| 12 | | 0.939 | 0.099 | G12 | | | |
| 21 | Second Lens | 0.832 | 0.417 | T2 | 1.661 | 20.374 | 1.356 |
| 22 | | 20.365 | 0.144 | G23 | | | |
| 31 | Third Lens | -2.047 | 0.489 | T3 | 1.661 | 20.374 | 2.057 |
| 32 | | -0.871 | 0.144 | G34 | | | |
| 41 | Fourth Lens | 164224.176 | 0.683 | T4 | 1.661 | 20.374 | -4.179 |
| 42 | | 2.649 | 0.060 | G4F | | | |
| 70 | Filter | INFINITY | 0.300 | | | |
| | | INFINITY | 0.030 | | | |
| 71 | Image Plane | INFINITY | | | | |

FIG. 26

| No. | 11 | 12 | 21 | 22 |
|---|---|---|---|---|
| K | -3.124932E+00 | -1.115793E+00 | -3.777042E-01 | 7.301281E+02 |
| $a_2$ | 0.000000E+00 | 0.000000E+00 | 0.000000E+00 | 0.000000E+00 |
| $a_4$ | -3.270059E-01 | -1.584764E+00 | -9.823725E-01 | 8.052178E-01 |
| $a_6$ | -1.493067E-01 | 5.004130E-01 | 3.843661E-01 | -3.165412E+00 |
| $a_8$ | 4.986518E+00 | 2.221833E+00 | -1.035045E+01 | -1.151756E+00 |
| $a_{10}$ | -2.289179E+01 | -8.490390E+00 | 1.968188E+01 | 1.350604E+01 |
| $a_{12}$ | 1.829538E+01 | 1.384971E+01 | -2.888539E+01 | -5.028679E+00 |
| $a_{14}$ | 1.239884E+02 | -3.244165E+01 | -4.428884E+01 | -3.947701E+01 |
| $a_{16}$ | -2.481478E+02 | 1.120656E+02 | 2.140762E+02 | 4.089774E+01 |
| No. | 31 | 32 | 41 | 42 |
| K | 2.500345E+00 | 8.327929E-02 | 3.267434E+01 | 5.251997E+00 |
| $a_2$ | 0.000000E+00 | 0.000000E+00 | 0.000000E+00 | 0.000000E+00 |
| $a_4$ | 5.375447E-01 | -4.852894E-01 | -1.026466E+00 | -5.479218E-01 |
| $a_6$ | -5.506637E+00 | 1.653141E+00 | 2.102015E+00 | 7.591856E-01 |
| $a_8$ | 1.716685E+01 | -2.706179E+00 | -1.940901E+00 | -5.384399E-01 |
| $a_{10}$ | -1.514077E+01 | 4.459104E+00 | 3.427782E-01 | -1.675029E-01 |
| $a_{12}$ | -2.466065E+00 | -1.104614E+00 | -1.395197E-01 | -5.481051E-02 |
| $a_{14}$ | 3.573940E+00 | -3.189194E+00 | 7.901811E-01 | 4.010000E-01 |
| $a_{16}$ | 4.356891E+00 | 1.002668E+01 | -4.677576E-02 | -2.028362E-01 |

FIG. 27

| Second Embodiment |||||||
|---|---|---|---|---|---|---|
| EFL=1.466mm, HFOV=37.500 Degrees, TTL=2.652mm, Fno=1.553, IMH=0.985mm |||||||
| No. | Radius | Ape. Stop Lens Thickness Air Gap | | Refractive Index | Abbe No. | Focus |
| | Object | INFINITY | INFINITY | | | |
| 80 | Ape. Stop | INFINITY | -0.051 | | | |
| 11 | First Lens | 1.795 | 0.429 | T1 | 1.661 | 20.374 | -6.024 |
| 12 | | 1.108 | 0.050 | G12 | | | |
| 21 | Second Lens | 0.817 | 0.348 | T2 | 1.661 | 20.374 | 1.364 |
| 22 | | 12.4264 | 0.262 | G23 | | | |
| 31 | Third Lens | -1.125 | 0.413 | T3 | 1.661 | 20.374 | 2.487 |
| 32 | | -0.750 | 0.039 | G34 | | | |
| 41 | Fourth Lens | 1.705 | 0.581 | T4 | 1.661 | 20.374 | -4.034 |
| 42 | | 0.888 | 0.185 | G4F | | | |
| 70 | Filter | INFINITY | 0.300 | | | |
| | | INFINITY | 0.044 | | | |
| 71 | Image Plane | INFINITY | | | | |

FIG. 28

| No. | 11 | 12 | 21 | 22 |
|---|---|---|---|---|
| K | -2.813405E-01 | -1.989920E+00 | -1.033009E+00 | 2.722900E+02 |
| $a_2$ | 0.000000E+00 | 0.000000E+00 | 0.000000E+00 | 0.000000E+00 |
| $a_4$ | -2.777022E-01 | -1.662443E+00 | -1.261725E+00 | 5.457233E-01 |
| $a_6$ | 6.112778E-02 | 5.226303E-01 | 4.317334E-01 | -3.088189E+00 |
| $a_8$ | 4.000628E+00 | 2.631562E+00 | -9.853066E+00 | -1.053093E+00 |
| $a_{10}$ | -2.455517E+01 | -8.574306E+00 | 2.180653E+01 | 1.333127E+01 |
| $a_{12}$ | 2.136805E+01 | 9.679016E+00 | -2.330289E+01 | -5.427629E+00 |
| $a_{14}$ | 1.419630E+02 | -4.403002E+01 | -4.082173E+01 | -3.910196E+01 |
| $a_{16}$ | -2.995195E+02 | 1.236069E+02 | 1.630495E+02 | 4.454325E+01 |
| No. | 31 | 32 | 41 | 42 |
| K | 2.202081E-01 | -3.173887E-01 | 1.307985E+00 | -5.926034E-01 |
| $a_2$ | 0.000000E+00 | 0.000000E+00 | 0.000000E+00 | 0.000000E+00 |
| $a_4$ | 6.400424E-01 | -2.797379E-01 | -1.071916E+00 | -9.513270E-01 |
| $a_6$ | -5.621347E+00 | 1.278612E+00 | 1.873812E+00 | 8.600388E-01 |
| $a_8$ | 1.711148E+01 | -2.494167E+00 | -1.783865E+00 | -4.535623E-01 |
| $a_{10}$ | -1.497397E+01 | 4.964426E+00 | 4.865980E-01 | -1.966789E-01 |
| $a_{12}$ | -2.242023E+00 | -1.596362E-01 | -4.786385E-01 | -1.238137E-01 |
| $a_{14}$ | 3.572020E+00 | -3.693541E+00 | -8.176050E-02 | 3.539490E-01 |
| $a_{16}$ | 4.548234E+00 | 2.798649E+00 | 7.955614E-01 | -1.011486E-01 |

FIG. 29

| Third Embodiment |||||||
|---|---|---|---|---|---|---|
| EFL=1.597mm, HFOV=37.500 Degrees, TTL=2.700mm, Fno=1.692, IMH=1.212mm |||||||
| No. | Radius | Ape. Stop Lens Thickness Air Gap || Refractive Index | Abbe No. | Focus |
| | Object | INFINITY | INFINITY | | | |
| 80 | Ape. Stop | INFINITY | -0.040 | | | |
| 11 | First Lens | 1.565 | 0.338 | T1 | 1.661 | 20.374 | -8.030 |
| 12 | | 1.097 | 0.049 | G12 | | | |
| 21 | Second Lens | 0.835 | 0.416 | T2 | 1.661 | 20.374 | 1.275 |
| 22 | | -20.523 | 0.157 | G23 | | | |
| 31 | Third Lens | -1.192 | 0.615 | T3 | 1.661 | 20.374 | 2.911 |
| 32 | | -0.869 | 0.146 | G34 | | | |
| 41 | Fourth Lens | 2.550 | 0.468 | T4 | 1.661 | 20.374 | -3.050 |
| 42 | | 1.021 | 0.150 | G4F | | | |
| 70 | Filter | INFINITY | 0.300 | | | | |
| | | INFINITY | 0.060 | | | | |
| 71 | Image Plane | INFINITY | | | | | |

FIG. 30

| No. | 11 | 12 | 21 | 22 |
|---|---|---|---|---|
| K | 2.741126E+00 | -3.011560E-01 | -3.445902E-01 | -4.186847E+03 |
| $a_2$ | 0.000000E+00 | 0.000000E+00 | 0.000000E+00 | 0.000000E+00 |
| $a_4$ | -2.262411E-01 | -1.488394E+00 | -1.130888E+00 | 3.894744E-01 |
| $a_6$ | -1.300745E+00 | -8.328173E-01 | 5.465901E-02 | -3.977131E+00 |
| $a_8$ | 6.849047E+00 | 5.151984E+00 | -9.270630E+00 | 1.162152E+00 |
| $a_{10}$ | -2.133863E+01 | -1.056500E+01 | 2.449881E+01 | 1.245432E+01 |
| $a_{12}$ | -2.015338E-01 | 1.006495E+01 | -1.482260E+01 | -4.832708E+00 |
| $a_{14}$ | 6.798401E+01 | 1.582774E+00 | -1.928360E+01 | -1.148979E+01 |
| $a_{16}$ | 3.349399E+01 | 3.642947E+01 | 6.197705E+01 | 2.706324E+00 |
| No. | 31 | 32 | 41 | 42 |
| K | 1.222768E+00 | -3.550627E-01 | -6.001225E+01 | -1.135896E+00 |
| $a_2$ | 0.000000E+00 | 0.000000E+00 | 0.000000E+00 | 0.000000E+00 |
| $a_4$ | 5.170415E-01 | -3.058466E-01 | -1.050410E+00 | -9.881877E-01 |
| $a_6$ | -6.949637E+00 | 1.343301E+00 | 1.810033E+00 | 8.980124E-01 |
| $a_8$ | 2.410738E+01 | -2.328578E+00 | -1.103604E+00 | -1.971632E-01 |
| $a_{10}$ | -2.357427E+01 | 6.903299E+00 | -8.743924E-02 | -1.331003E-01 |
| $a_{12}$ | 1.642238E+00 | -4.634612E+00 | -4.593989E-01 | -3.898691E-02 |
| $a_{14}$ | 9.452031E+00 | -5.819098E+00 | 3.959703E-01 | 4.723076E-02 |
| $a_{16}$ | -5.796600E+00 | 7.005441E+00 | 5.818279E-02 | 1.655874E-03 |

FIG. 31

| Fourth Embodiment |||||||
|---|---|---|---|---|---|---|
| EFL=1.539mm, HFOV=37.500 Degrees, TTL=2.654mm, Fno=1.630, IMH=0.984mm |||||||
| No. | Radius || Ape. Stop Lens Thickness Air Gap || Refractive Index | Abbe No. | Focus |
| | Object | INFINITY | INFINITY ||||
| 80 | Ape. Stop | INFINITY | -0.052 ||||
| 11 | First Lens | 1.707 | 0.333 | T1 | 1.661 | 20.374 | -5.790 |
| 12 | | 1.077 | 0.050 | G12 |||
| 21 | Second Lens | 0.823 | 0.366 | T2 | 1.661 | 20.374 | 1.386 |
| 22 | | 10.701 | 0.195 | G23 |||
| 31 | Third Lens | -1.159 | 0.388 | T3 | 1.661 | 20.374 | 2.821 |
| 32 | | -0.795 | 0.045 | G34 |||
| 41 | Fourth Lens | 2.360 | 0.756 | T4 | 1.661 | 20.374 | -3.116 |
| 42 | | 0.942 | 0.176 | G4F |||
| 70 | Filter | INFINITY | 0.300 ||||
| | | INFINITY | 0.044 ||||
| 71 | Image Plane | INFINITY |||||

FIG. 32

| No. | 11 | 12 | 21 | 22 |
|---|---|---|---|---|
| K | -3.412417E-01 | -1.700517E+00 | -9.894098E-01 | 2.140208E+02 |
| $a_2$ | 0.000000E+00 | 0.000000E+00 | 0.000000E+00 | 0.000000E+00 |
| $a_4$ | -2.770132E-01 | -1.652521E+00 | -1.250856E+00 | 5.350419E-01 |
| $a_6$ | -1.133674E-01 | 4.464087E-01 | 5.432256E-01 | -3.087895E+00 |
| $a_8$ | 3.788825E+00 | 2.486376E+00 | -9.628322E+00 | -1.037774E+00 |
| $a_{10}$ | -2.428630E+01 | -8.613925E+00 | 2.233877E+01 | 1.330527E+01 |
| $a_{12}$ | 2.358641E+01 | 1.041346E+01 | -2.183354E+01 | -5.565685E+00 |
| $a_{14}$ | 1.462705E+02 | -3.972640E+01 | -3.763018E+01 | -3.924633E+01 |
| $a_{16}$ | -3.243699E+02 | 1.445682E+02 | 1.646495E+02 | 4.527161E+01 |
| No. | 31 | 32 | 41 | 42 |
| K | 1.459917E-01 | -3.028357E-01 | 3.169254E+00 | -5.497608E-01 |
| $a_2$ | 0.000000E+00 | 0.000000E+00 | 0.000000E+00 | 0.000000E+00 |
| $a_4$ | 6.680953E-01 | -3.157125E-01 | -1.017073E+00 | -9.184582E-01 |
| $a_6$ | -5.614205E+00 | 1.279025E+00 | 1.886484E+00 | 8.581116E-01 |
| $a_8$ | 1.713199E+01 | -2.431046E+00 | -1.858749E+00 | -4.516170E-01 |
| $a_{10}$ | -1.494732E+01 | 5.072228E+00 | 3.675155E-01 | -1.866644E-01 |
| $a_{12}$ | -2.095427E+00 | -6.121165E-02 | -5.829314E-01 | -1.173898E-01 |
| $a_{14}$ | 3.683247E+00 | -3.568670E+00 | -3.909362E-02 | 3.527784E-01 |
| $a_{16}$ | 3.939306E+00 | 3.104697E+00 | 1.306362E+00 | -1.120496E-01 |

FIG. 33

| \multicolumn{6}{c|}{Fifth Embodiment} | | | | | |
|---|---|---|---|---|---|
| \multicolumn{6}{c|}{EFL=1.654mm, HFOV=37.500 Degrees, TTL=2.901mm, Fno=1.753, IMH=1.210mm} | | | | | |
| No. | Radius | Ape. Stop Lens Thickness Air Gap | | Refractive Index | Abbe No. | Focus |
| | Object | INFINITY | INFINITY | | | |
| 80 | Ape. Stop | INFINITY | -0.038 | | | |
| 11 | First Lens | 1.869 | 0.363 | T1 | 1.661 | 20.374 | -7.767 |
| 12 | | 1.253 | 0.088 | G12 | | | |
| 21 | Second Lens | 0.892 | 0.431 | T2 | 1.661 | 20.374 | 1.237 |
| 22 | | -5.283 | 0.213 | G23 | | | |
| 31 | Third Lens | -1.028 | 0.664 | T3 | 1.661 | 20.374 | 2.463 |
| 32 | | -0.775 | 0.170 | G34 | | | |
| 41 | Fourth Lens | 7.352 | 0.474 | T4 | 1.661 | 20.374 | -2.380 |
| 42 | | 1.221 | 0.148 | G4F | | | |
| 70 | Filter | INFINITY | 0.300 | | | |
| | | INFINITY | 0.049 | | | |
| 71 | Image Plane | INFINITY | | | | |

FIG. 34

| No. | 11 | 12 | 21 | 22 |
|---|---|---|---|---|
| K | -1.857704E+00 | -1.569876E+00 | -2.414607E-01 | 5.139159E+01 |
| $a_2$ | 0.000000E+00 | 0.000000E+00 | 0.000000E+00 | 0.000000E+00 |
| $a_4$ | -3.439898E-01 | -1.582965E+00 | -1.142359E+00 | 3.784499E-01 |
| $a_6$ | -7.178807E-01 | -4.720745E-01 | 2.123045E-01 | -3.475740E+00 |
| $a_8$ | 5.598304E+00 | 5.597632E+00 | -1.000641E+01 | 1.153361E+00 |
| $a_{10}$ | -2.218174E+01 | -1.099105E+01 | 2.500239E+01 | 1.262720E+01 |
| $a_{12}$ | 1.264041E+01 | 9.754457E+00 | -2.686231E+00 | -5.320620E+00 |
| $a_{14}$ | 8.812666E+01 | -1.069931E+01 | -7.078465E+00 | -1.099811E+01 |
| $a_{16}$ | -1.636925E+02 | 2.419103E+01 | -2.985752E+01 | -5.225374E-01 |
| No. | 31 | 32 | 41 | 42 |
| K | 7.350921E-01 | -4.005112E-01 | 1.217308E+01 | -2.436449E-01 |
| $a_2$ | 0.000000E+00 | 0.000000E+00 | 0.000000E+00 | 0.000000E+00 |
| $a_4$ | 4.156251E-01 | -1.690943E-01 | -1.136077E+00 | -9.678865E-01 |
| $a_6$ | -6.521113E+00 | 1.201366E+00 | 2.198830E+00 | 1.114708E+00 |
| $a_8$ | 2.362778E+01 | -2.793577E+00 | -1.405576E+00 | -5.386393E-01 |
| $a_{10}$ | -2.426249E+01 | 7.063876E+00 | -4.191514E-01 | -2.679332E-02 |
| $a_{12}$ | 1.935478E+00 | -4.758639E+00 | -5.804938E-01 | -2.307936E-02 |
| $a_{14}$ | 6.745895E+00 | -5.693314E+00 | 2.069120E+00 | 8.288115E-02 |
| $a_{16}$ | 2.623814E+00 | 6.767548E+00 | -1.171620E+00 | -2.772241E-02 |

FIG. 35

| Six Embodiment |||||||
| EFL=1.465mm, HFOV=37.500 Degrees, TTL=2.642mm, Fno=1.552, IMH=0.979mm |||||||
| No. | Radius | Ape. Stop Lens Thickness Air Gap || Refractive Index | Abbe No. | Focus |
| --- | --- | --- | --- | --- | --- | --- |
|  | Object | INFINITY | INFINITY |  |  |  |
| 80 | Ape. Stop | INFINITY | -0.041 |  |  |  |
| 11 | First Lens | 1.692 | 0.333 | T1 | 1.661 | 20.374 | -6.526 |
| 12 |  | 1.109 | 0.107 | G12 |  |  |  |
| 21 | Second Lens | 0.811 | 0.447 | T2 | 1.661 | 20.374 | 1.358 |
| 22 |  | 11.046 | 0.203 | G23 |  |  |  |
| 31 | Third Lens | -1.149 | 0.437 | T3 | 1.661 | 20.374 | 2.572 |
| 32 |  | -0.773 | 0.113 | G34 |  |  |  |
| 41 | Fourth Lens | 1.632 | 0.475 | T4 | 1.661 | 20.374 | -3.894 |
| 42 |  | 0.871 | 0.184 | G4F |  |  |  |
| 70 | Filter | INFINITY | 0.300 |  |  |  |
|  |  | INFINITY | 0.044 |  |  |  |
| 71 | Image Plane | INFINITY |  |  |  |  |

FIG. 36

| No. | 11 | 12 | 21 | 22 |
|---|---|---|---|---|
| K | -6.087132E+00 | -3.406830E+00 | -6.601259E-01 | 9.611360E+01 |
| $a_2$ | 0.000000E+00 | 0.000000E+00 | 0.000000E+00 | 0.000000E+00 |
| $a_4$ | -3.894810E-01 | -1.664928E+00 | -1.142271E+00 | 5.250013E-01 |
| $a_6$ | -1.938183E-01 | 7.198580E-01 | 5.174989E-01 | -3.013190E+00 |
| $a_8$ | 4.226183E+00 | 2.792922E+00 | -9.604071E+00 | -9.329093E-01 |
| $a_{10}$ | -2.322354E+01 | -8.891557E+00 | 2.277255E+01 | 1.342854E+01 |
| $a_{12}$ | 2.306497E+01 | 8.124346E+00 | -2.085933E+01 | -5.453130E+00 |
| $a_{14}$ | 1.369122E+02 | -4.507982E+01 | -4.053068E+01 | -3.935869E+01 |
| $a_{16}$ | -3.504441E+02 | 1.440380E+02 | 1.295274E+02 | 4.394965E+01 |
| No. | 31 | 32 | 41 | 42 |
| K | 3.444581E-01 | -2.871491E-01 | -4.720618E-01 | -6.055543E-01 |
| $a_2$ | 0.000000E+00 | 0.000000E+00 | 0.000000E+00 | 0.000000E+00 |
| $a_4$ | 6.392268E-01 | -2.882562E-01 | -1.119205E+00 | -9.938266E-01 |
| $a_6$ | -5.706054E+00 | 1.251585E+00 | 1.822410E+00 | 8.859871E-01 |
| $a_8$ | 1.699394E+01 | -2.568824E+00 | -1.751513E+00 | -4.368239E-01 |
| $a_{10}$ | -1.507614E+01 | 4.847326E+00 | 5.913970E-01 | -1.898214E-01 |
| $a_{12}$ | -2.302902E+00 | -2.982992E-01 | -3.501931E-01 | -1.281112E-01 |
| $a_{14}$ | 3.661846E+00 | -3.926511E+00 | -9.458442E-02 | 3.431935E-01 |
| $a_{16}$ | 4.903834E+00 | 2.204846E+00 | 2.937025E-01 | -1.153347E-01 |

FIG. 37

| | Seventh Embodiment | | | | | |
|---|---|---|---|---|---|---|
| | EFL=1.475mm, HFOV=37.500 Degrees, TTL=2.653mm, Fno=1.563, IMH= 0.984mm |
| No. | Radius | Ape. Stop Lens Thickness Air Gap | | Refractive Index | Abbe No. | Focus |
| | Object | INFINITY | INFINITY | | | |
| 80 | Ape. Stop | INFINITY | -0.051 | | | |
| 11 | First Lens | 1.754 | 0.439 | T1 | 1.661 | 20.374 | -7.952 |
| 12 | | 1.175 | 0.058 | G12 | | | |
| 21 | Second Lens | 0.798 | 0.329 | T2 | 1.661 | 20.374 | 1.374 |
| 22 | | 7.986 | 0.189 | G23 | | | |
| 31 | Third Lens | -1.039 | 0.418 | T3 | 1.661 | 20.374 | 2.487 |
| 32 | | -0.724 | 0.033 | G34 | | | |
| 41 | Fourth Lens | 2.352 | 0.669 | T4 | 1.661 | 20.374 | -3.177 |
| 42 | | 0.965 | 0.179 | G4F | | | |
| 70 | Filter | INFINITY | 0.300 | | | |
| | | INFINITY | 0.039 | | | |
| 71 | Image Plane | INFINITY | | | | |

FIG. 38

| No. | 11 | 12 | 21 | 22 |
|---|---|---|---|---|
| K | -6.923715E-01 | -4.144505E+00 | -9.519528E-01 | 4.036216E+01 |
| $a_2$ | 0.000000E+00 | 0.000000E+00 | 0.000000E+00 | 0.000000E+00 |
| $a_4$ | -2.812771E-01 | -1.661359E+00 | -1.236197E+00 | 6.445949E-01 |
| $a_6$ | 9.439968E-02 | 6.406788E-01 | 6.522532E-02 | -3.860830E+00 |
| $a_8$ | 2.491611E+00 | 1.119029E+00 | -1.235887E+01 | -6.941292E-01 |
| $a_{10}$ | -1.857275E+01 | -7.908758E+00 | 2.188068E+01 | 1.472347E+01 |
| $a_{12}$ | 1.941083E+01 | 2.261520E+01 | -6.812926E+00 | -4.237209E+00 |
| $a_{14}$ | 9.622759E+01 | -2.142390E+01 | -1.337669E+01 | -3.884293E+01 |
| $a_{16}$ | -2.240993E+02 | 2.425856E+01 | 8.540116E+01 | 4.003460E+01 |
| No. | 31 | 32 | 41 | 42 |
| K | 1.958393E-01 | -3.964697E-01 | 3.880495E+00 | -5.257966E-01 |
| $a_2$ | 0.000000E+00 | 0.000000E+00 | 0.000000E+00 | 0.000000E+00 |
| $a_4$ | 4.649032E-01 | -2.168633E-01 | -9.312787E-01 | -8.525912E-01 |
| $a_6$ | -4.926470E+00 | 1.111528E+00 | 1.854154E+00 | 8.169938E-01 |
| $a_8$ | 1.727365E+01 | -2.494858E+00 | -2.200964E+00 | -4.393175E-01 |
| $a_{10}$ | -1.531561E+01 | 5.514995E+00 | 1.798392E-01 | -1.850382E-01 |
| $a_{12}$ | -2.640247E+00 | 4.514749E-01 | 4.093406E-01 | -1.090462E-01 |
| $a_{14}$ | 2.991942E+00 | -4.361911E+00 | 1.854244E+00 | 3.741624E-01 |
| $a_{16}$ | 4.843653E+00 | 1.097245E+00 | -2.253676E+00 | -1.468041E-01 |

FIG. 39

| Eighth Embodiment |||||||
|---|---|---|---|---|---|---|
| EFL=1.618mm, HFOV=37.500 Degrees, TTL=2.810mm, Fno=1.714, IMH=1.022mm |||||||
| No. | Radius | Ape. Stop Lens Thickness Air Gap | | Refractive Index | Abbe No. | Focus |
| | Object | INFINITY | INFINITY | | | |
| 80 | Ape. Stop | INFINITY | -0.023 | | | |
| 11 | First Lens | 1.585 | 0.351 | T1 | 1.661 | 20.374 | -50.000 |
| 12 | | 1.380 | 0.231 | G12 | | | |
| 21 | Second Lens | 1.217 | 0.587 | T2 | 1.661 | 20.374 | 0.923 |
| 22 | | -0.917 | 0.170 | G23 | | | |
| 31 | Third Lens | -0.825 | 0.442 | T3 | 1.661 | 20.374 | -1.987 |
| 32 | | -2.886 | 0.083 | G34 | | | |
| 41 | Fourth Lens | 156122.243 | 0.565 | T4 | 1.661 | 20.374 | -22.153 |
| 42 | | 14.045 | 0.046 | G4F | | | |
| 70 | Filter | INFINITY | 0.300 | | | | |
| | | INFINITY | 0.035 | | | | |
| 71 | Image Plane | INFINITY | | | | | |

FIG. 40

| No. | 11 | 12 | 21 | 22 |
|---|---|---|---|---|
| K | -1.029110E+00 | 2.772793E-01 | 8.996580E-01 | 6.639206E-02 |
| $a_2$ | 0.000000E+00 | 0.000000E+00 | 0.000000E+00 | 0.000000E+00 |
| $a_4$ | -3.497633E-01 | -9.366291E-01 | -4.759994E-01 | 1.029299E+00 |
| $a_6$ | -1.486143E+00 | -8.405879E-01 | 1.453033E+00 | -1.518491E+00 |
| $a_8$ | 7.076668E+00 | 1.765915E+00 | -1.074788E+01 | -3.658182E-01 |
| $a_{10}$ | -2.906142E+01 | -7.261732E+00 | 2.277013E+01 | 8.469309E+00 |
| $a_{12}$ | 1.074256E+01 | 1.841125E+01 | -1.259446E+01 | -6.982182E+00 |
| $a_{14}$ | 2.458408E+02 | -1.769966E+01 | -3.486537E+01 | -1.460423E+01 |
| $a_{16}$ | -5.390890E+02 | -6.436617E+00 | 4.664452E+01 | 1.709968E+01 |
| No. | 31 | 32 | 41 | 42 |
| K | -1.138958E-01 | 2.816635E+00 | -8.999984E+01 | 7.843454E+01 |
| $a_2$ | 0.000000E+00 | 0.000000E+00 | 0.000000E+00 | 0.000000E+00 |
| $a_4$ | 1.525409E+00 | -1.414736E+00 | -2.440592E+00 | -8.627478E-02 |
| $a_6$ | -5.537921E+00 | 2.157097E+00 | 3.710054E+00 | 3.236442E-01 |
| $a_8$ | 1.585141E+01 | -2.085531E+00 | 7.797075E-01 | -4.837331E-01 |
| $a_{10}$ | -1.678223E+01 | 8.173107E+00 | -6.575223E+00 | 9.410716E-02 |
| $a_{12}$ | 1.281428E+00 | -1.297351E+01 | 2.521488E+00 | 5.490455E-02 |
| $a_{14}$ | 8.695213E+00 | 9.930734E-01 | 3.157574E+00 | 1.611783E-02 |
| $a_{16}$ | -6.828493E+00 | 5.700672E+00 | -1.325617E+00 | -1.803500E-02 |

FIG. 41

| \multicolumn{7}{c|}{Ninth Embodiment} |
| --- | --- | --- | --- | --- | --- | --- |

| | | | Ape. Stop | | | |
| --- | --- | --- | --- | --- | --- | --- |
| | | | Lens Thickness | Refractive | | |
| No. | Radius | | Air Gap | Index | Abbe No. | Focus |
| | Object | INFINITY | INFINITY | | | |
| 80 | Ape. Stop | INFINITY | -0.055 | | | |
| 11 | First Lens | 1.546 | 0.332 | T1 | 1.545 | 55.987 | -5.455 |
| 12 | | 0.935 | 0.068 | G12 | | | |
| 21 | Second Lens | 0.785 | 0.395 | T2 | 1.661 | 20.374 | 1.363 |
| 22 | | 6.885 | 0.166 | G23 | | | |
| 31 | Third Lens | -1.363 | 0.442 | T3 | 1.661 | 20.374 | 2.561 |
| 32 | | -0.834 | 0.045 | G34 | | | |
| 41 | Fourth Lens | 2.257 | 0.676 | T4 | 1.661 | 20.374 | -3.189 |
| 42 | | 0.942 | 0.185 | G4F | | | |
| 70 | Filter | INFINITY | 0.300 | | | | |
| | | INFINITY | 0.045 | | | | |
| 71 | Image Plane | INFINITY | | | | | |

EFL=1.504mm, HFOV=37.500 Degrees, TTL=2.654mm, Fno=1.593, IMH=0.984mm

FIG. 42

| No. | 11 | 12 | 21 | 22 |
|---|---|---|---|---|
| K | -2.619053E+00 | -2.854163E+00 | -7.001859E-01 | 7.895535E+01 |
| $a_2$ | 0.000000E+00 | 0.000000E+00 | 0.000000E+00 | 0.000000E+00 |
| $a_4$ | -3.296152E-01 | -1.700490E+00 | -1.155040E+00 | 5.734358E-01 |
| $a_6$ | -1.798116E-02 | 5.461650E-01 | 3.560359E-01 | -3.090674E+00 |
| $a_8$ | 4.550459E+00 | 2.226679E+00 | -9.787711E+00 | -1.028340E+00 |
| $a_{10}$ | -2.411811E+01 | -9.028822E+00 | 2.252775E+01 | 1.340598E+01 |
| $a_{12}$ | 1.089889E+01 | 1.223983E+01 | -2.140178E+01 | -5.385573E+00 |
| $a_{14}$ | 1.420958E+02 | -3.245598E+01 | -3.953231E+01 | -3.950609E+01 |
| $a_{16}$ | -2.404513E+02 | 1.383647E+02 | 1.461504E+02 | 4.289501E+01 |
| No. | 31 | 32 | 41 | 42 |
| K | 1.646685E-01 | -1.074943E-01 | -1.630756E+00 | -5.425033E-01 |
| $a_2$ | 0.000000E+00 | 0.000000E+00 | 0.000000E+00 | 0.000000E+00 |
| $a_4$ | 6.669621E-01 | -3.860910E-01 | -1.112247E+00 | -8.494444E-01 |
| $a_6$ | -5.687664E+00 | 1.401403E+00 | 1.908971E+00 | 7.807012E-01 |
| $a_8$ | 1.699646E+01 | -2.501326E+00 | -1.735409E+00 | -4.804285E-01 |
| $a_{10}$ | -1.501908E+01 | 4.694413E+00 | 3.364120E-01 | -1.592156E-01 |
| $a_{12}$ | -2.123517E+00 | -5.797800E-01 | -7.381009E-01 | -6.851827E-02 |
| $a_{14}$ | 3.811588E+00 | -3.533045E+00 | -7.839621E-02 | 3.770560E-01 |
| $a_{16}$ | 4.010994E+00 | 5.237294E+00 | 1.638118E+00 | -1.631806E-01 |

FIG. 43

| \multicolumn{7}{c|}{Tenth Embodiment} |
|---|---|---|---|---|---|---|
| \multicolumn{7}{c|}{EFL=1.504mm, HFOV=37.500 Degrees, TTL=2.658mm, Fno=1.594, IMH=0.985mm} |
| No. | Radius | Ape. Stop Lens Thickness Air Gap | | Refractive Index | Abbe No. | Focus |
| | Object | INFINITY | INFINITY | | | |
| 80 | Ape. Stop | INFINITY | -0.057 | | | |
| 11 | First Lens | 1.587 | 0.333 | T1 | 1.523 | 54.512 | -4.630 |
| 12 | | 0.884 | 0.057 | G12 | | | |
| 21 | Second Lens | 0.769 | 0.386 | T2 | 1.661 | 20.374 | 1.366 |
| 22 | | 5.503 | 0.165 | G23 | | | |
| 31 | Third Lens | -1.318 | 0.452 | T3 | 1.523 | 54.512 | 2.804 |
| 32 | | -0.768 | 0.045 | G34 | | | |
| 41 | Fourth Lens | 1.831 | 0.691 | T4 | 1.661 | 20.374 | -4.231 |
| 42 | | 0.929 | 0.186 | G4F | | | |
| 70 | Filter | INFINITY | 0.300 | | | | |
| | | INFINITY | 0.044 | | | | |
| 71 | Image Plane | INFINITY | | | | | |

FIG. 44

| No. | 11 | 12 | 21 | 22 |
|---|---|---|---|---|
| K | -9.682177E-01 | -2.876898E+00 | -8.062293E-01 | 5.000011E+01 |
| $a_2$ | 0.000000E+00 | 0.000000E+00 | 0.000000E+00 | 0.000000E+00 |
| $a_4$ | -2.967363E-01 | -1.711609E+00 | -1.181595E+00 | 5.830962E-01 |
| $a_6$ | -1.056702E-01 | 4.274721E-01 | 1.010376E-01 | -3.117119E+00 |
| $a_8$ | 4.771476E+00 | 1.865626E+00 | -9.974651E+00 | -1.170127E+00 |
| $a_{10}$ | -2.371003E+01 | -8.521799E+00 | 2.318395E+01 | 1.315876E+01 |
| $a_{12}$ | 9.972088E+00 | 1.784356E+01 | -1.859512E+01 | -5.563991E+00 |
| $a_{14}$ | 1.378160E+02 | -1.816049E+01 | -3.458898E+01 | -3.927294E+01 |
| $a_{16}$ | -2.109501E+02 | 1.141072E+02 | 1.399482E+02 | 4.427922E+01 |
| No. | 31 | 32 | 41 | 42 |
| K | -4.618659E-01 | -1.597612E-01 | 1.221095E-01 | -5.631255E-01 |
| $a_2$ | 0.000000E+00 | 0.000000E+00 | 0.000000E+00 | 0.000000E+00 |
| $a_4$ | 7.061227E-01 | -4.282828E-01 | -1.083874E+00 | -8.456573E-01 |
| $a_6$ | -5.672777E+00 | 1.563414E+00 | 1.870997E+00 | 7.734461E-01 |
| $a_8$ | 1.702606E+01 | -2.343704E+00 | -1.763370E+00 | -4.938115E-01 |
| $a_{10}$ | -1.496482E+01 | 4.763579E+00 | 3.456103E-01 | -1.705276E-01 |
| $a_{12}$ | -2.040518E+00 | -4.577737E-01 | -6.968530E-01 | -7.272054E-02 |
| $a_{14}$ | 3.907285E+00 | -2.727423E+00 | -3.313629E-02 | 3.816816E-01 |
| $a_{16}$ | 3.984992E+00 | 8.362226E+00 | 1.653134E+00 | -1.505384E-01 |

FIG. 45

| Embodiment | 1st | 2nd | 3rd | 4th | 5th | 6th | 7th | 8th | 9th | 10th |
|---|---|---|---|---|---|---|---|---|---|---|
| T1 | 0.371 | 0.429 | 0.338 | 0.333 | 0.363 | 0.333 | 0.439 | 0.351 | 0.332 | 0.333 |
| G12 | 0.099 | 0.050 | 0.049 | 0.050 | 0.088 | 0.107 | 0.058 | 0.231 | 0.068 | 0.057 |
| T2 | 0.417 | 0.348 | 0.416 | 0.366 | 0.431 | 0.447 | 0.329 | 0.587 | 0.395 | 0.386 |
| G23 | 0.144 | 0.262 | 0.157 | 0.195 | 0.213 | 0.203 | 0.189 | 0.170 | 0.166 | 0.165 |
| T3 | 0.489 | 0.413 | 0.615 | 0.388 | 0.664 | 0.437 | 0.418 | 0.442 | 0.442 | 0.452 |
| G34 | 0.144 | 0.039 | 0.146 | 0.045 | 0.170 | 0.113 | 0.033 | 0.083 | 0.045 | 0.045 |
| T4 | 0.683 | 0.581 | 0.468 | 0.756 | 0.474 | 0.475 | 0.669 | 0.565 | 0.676 | 0.691 |
| G4F | 0.060 | 0.185 | 0.150 | 0.176 | 0.148 | 0.184 | 0.179 | 0.046 | 0.185 | 0.186 |
| TF | 0.300 | 0.300 | 0.300 | 0.300 | 0.300 | 0.300 | 0.300 | 0.300 | 0.300 | 0.300 |
| GFP | 0.030 | 0.044 | 0.060 | 0.044 | 0.049 | 0.044 | 0.039 | 0.035 | 0.045 | 0.044 |
| υ1 | 20.374 | 20.374 | 20.374 | 20.374 | 20.374 | 20.374 | 20.374 | 20.374 | 55.987 | 54.512 |
| υ2 | 20.374 | 20.374 | 20.374 | 20.374 | 20.374 | 20.374 | 20.374 | 20.374 | 20.374 | 20.374 |
| υ3 | 20.374 | 20.374 | 20.374 | 20.374 | 20.374 | 20.374 | 20.374 | 20.374 | 20.374 | 54.512 |
| υ4 | 20.374 | 20.374 | 20.374 | 20.374 | 20.374 | 20.374 | 20.374 | 20.374 | 20.374 | 20.374 |
| EFL | 1.440 | 1.466 | 1.597 | 1.539 | 1.654 | 1.465 | 1.475 | 1.618 | 1.504 | 1.504 |
| TL | 2.347 | 2.122 | 2.190 | 2.133 | 2.404 | 2.114 | 2.135 | 2.429 | 2.124 | 2.127 |
| BFL | 0.390 | 0.529 | 0.510 | 0.520 | 0.497 | 0.528 | 0.518 | 0.381 | 0.530 | 0.531 |
| ALT | 1.960 | 1.771 | 1.837 | 1.844 | 1.932 | 1.692 | 1.854 | 1.945 | 1.846 | 1.861 |
| AAG | 0.387 | 0.351 | 0.353 | 0.289 | 0.472 | 0.423 | 0.281 | 0.484 | 0.279 | 0.266 |
| TTL | 2.737 | 2.652 | 2.700 | 2.654 | 2.901 | 2.642 | 2.653 | 2.810 | 2.654 | 2.658 |

FIG. 46

| Embodiment | 1st | 2nd | 3rd | 4th | 5th | 6th | 7th | 8th | 9th | 10th |
|---|---|---|---|---|---|---|---|---|---|---|
| υ1+υ2+υ3+υ4 | 81.496 | 81.496 | 81.496 | 81.496 | 81.496 | 81.496 | 81.496 | 81.496 | 117.109 | 149.772 |
| (G12+T2)/(T1+G23) | 1.004 | 0.576 | 0.938 | 0.788 | 0.902 | 1.032 | 0.616 | 1.570 | 0.930 | 0.890 |
| TL/(T1+G23) | 4.563 | 3.073 | 4.421 | 4.042 | 4.174 | 3.943 | 3.399 | 4.662 | 4.266 | 4.276 |
| TTL/(G23+T4) | 3.309 | 3.144 | 4.315 | 2.790 | 4.221 | 3.896 | 3.091 | 3.824 | 3.152 | 3.107 |
| TL/(G23+T4) | 2.838 | 2.517 | 3.500 | 2.243 | 3.498 | 3.118 | 2.487 | 3.306 | 2.523 | 2.487 |
| TTL/(T1+G23) | 5.321 | 3.839 | 5.450 | 5.028 | 5.037 | 4.927 | 4.223 | 5.393 | 5.329 | 5.343 |
| TL/T3 | 4.798 | 5.138 | 3.560 | 5.494 | 3.621 | 4.840 | 5.113 | 5.500 | 4.807 | 4.711 |
| (G12+T2)/(T1+G34) | 1.004 | 0.851 | 0.960 | 1.100 | 0.974 | 1.241 | 0.819 | 1.882 | 1.228 | 1.173 |
| TL/(G34+T4) | 2.837 | 3.420 | 3.564 | 2.662 | 3.728 | 3.597 | 3.040 | 3.746 | 2.946 | 2.892 |
| TL/(T1+G34) | 4.562 | 4.537 | 4.523 | 5.643 | 4.507 | 4.742 | 4.522 | 5.588 | 5.633 | 5.635 |
| TL/T4 | 3.434 | 3.652 | 4.675 | 2.821 | 5.068 | 4.449 | 3.192 | 4.298 | 3.141 | 3.080 |
| TTL/T1 | 7.384 | 6.188 | 7.986 | 7.969 | 7.991 | 7.927 | 6.048 | 7.995 | 7.990 | 7.990 |
| ALT/T1 | 5.289 | 4.133 | 5.434 | 5.537 | 5.323 | 5.076 | 4.227 | 5.535 | 5.557 | 5.595 |
| (G12+T2)/T1 | 1.393 | 0.929 | 1.375 | 1.249 | 1.431 | 1.661 | 0.882 | 2.328 | 1.394 | 1.331 |
| TTL/(G34+T4) | 3.309 | 4.274 | 4.394 | 3.312 | 4.499 | 4.494 | 3.777 | 4.333 | 3.680 | 3.613 |
| ALT/(G34+T4) | 2.370 | 2.854 | 2.990 | 2.301 | 2.997 | 2.878 | 2.640 | 3.000 | 2.559 | 2.530 |
| TTL/BFL | 7.019 | 5.009 | 5.294 | 5.099 | 5.836 | 5.008 | 5.121 | 7.380 | 5.010 | 5.009 |
| ALT/AAG | 5.071 | 5.041 | 5.210 | 6.374 | 4.096 | 4.004 | 6.602 | 4.020 | 6.628 | 6.992 |

FIG. 47

OPTICAL IMAGING LENS

CROSS REFERENCE TO RELATED APPLICATIONS

This application is a continuation application of U.S. application Ser. No. 16/798,438, filed on Feb. 24, 2020, which is a continuation application of U.S. application Ser. No. 15/997,703, filed on Jun. 5, 2018. The contents of these applications are incorporated herein by reference.

BACKGROUND OF THE INVENTION

1. Field of the Invention

The present invention generally relates to an optical imaging lens. Specifically speaking, the present invention is directed to an optical imaging lens for use in a portable electronic device such as a mobile phone, a camera, a tablet personal computer, or a personal digital assistant (PDA) for taking pictures or for recording videos and for the application of 3D sensing.

2. Description of the Prior Art

In recent years, the specification of the consumer's electronic products change all the time to keep on pursuing the improvements, so does the specification upgrade of the key components of those electronic products such as an optical imaging lens to meet the increasing consumers' demands. The most important features of an optical imaging lens are the imaging quality and the size. However, as far as the imaging quality is concerned, the demands for the better imaging quality are getting higher and higher owing to the consumers' request with the development of the image sensing technology. In the field of optical imagining lens design, in addition to the pursuit of a thinner optical imaging lens, the lens imaging quality and performance must also be taken into account. Even for the application in a vehicle or in a dim place, the demands for enhancing or keeping the field of view and the aperture stop are also crucial. When it comes to the structure of an optical imaging lens of four lens elements, the conventional invention has a distance from the object-side surface of the first lens element to an image plane too vast to facilitate the reduction of the size of a mobile phone and a digital camera.

However, in order to produce the optical imaging lens with good imaging quality and small size, it is not as simple as just scaling down the size of the optical imaging lens with good imaging quality. The designs not only involve the material properties, but also the production, the assembly yield and other practical issues with respect to fabrication which should also be taken into consideration as well.

Accordingly, the techniques to diminish a mini-lens are clearly more difficult than to diminish a conventional one. Therefore, how to fabricate an optical imaging lens that meets the requirements of consumer electronic products and to continuously improve the imaging quality is always an important objective in this technical field to research.

SUMMARY OF THE INVENTION

In view of the above, multiple embodiments of the present invention propose an optical imaging lens of four lens elements which has reduced optical imaging lens system length, ensured imaging quality, a maintained or an enhanced field of view, a maintained f-number, good optical performance and it is technically possible. The optical imaging lens of four lens elements of the present invention from an object side to an image side in order along an optical axis has a first lens element, a second lens element, a third lens element and a fourth lens element. Each one of the first lens element, the second lens element, the third lens element and the fourth lens element respectively has an object-side surface which faces toward the object side to allow imaging rays to pass through as well as an image-side surface which faces toward the image side to allow the imaging rays to pass through.

In one embodiment of the present invention, the first lens element has negative refracting power, a periphery region of the object-side surface of the second lens element is concave, an optical-axis region of the object-side surface of the third lens element is concave. Lens elements having refracting power included by the optical imaging lens are only the four lens elements described above. $\upsilon 1$ is an Abbe number of the first lens element, $\upsilon 2$ is an Abbe number of the second lens element, $\upsilon 3$ is an Abbe number of the third lens element and $\upsilon 4$ is an Abbe number of the fourth lens element. The optical imaging lens satisfies the relationship: $\upsilon 1+\upsilon 2+\upsilon 3+\upsilon 4 \leq 150.000$.

In another one embodiment of the present invention, the first lens element has negative refracting power, a periphery region of the object-side surface of the second lens element is concave, an optical-axis region of the object-side surface of the fourth lens element is convex. Lens elements having refracting power included by the optical imaging lens are only the four lens elements described above. $\upsilon 1$ is an Abbe number of the first lens element, $\upsilon 2$ is an Abbe number of the second lens element, $\upsilon 3$ is an Abbe number of the third lens element and $\upsilon 4$ is an Abbe number of the fourth lens element. The optical imaging lens satisfies the relationship: $\upsilon 1+\upsilon 2+\upsilon 3+\upsilon 4 \leq 150.000$.

In still another one embodiment of the present invention, the first lens element has negative refracting power, a periphery region of the object-side surface of the second lens element is concave, an optical-axis region of the image-side surface of the fourth lens element is concave. Lens elements having refracting power included by the optical imaging lens are only the four lens elements described above. $\upsilon 1$ is an Abbe number of the first lens element, $\upsilon 2$ is an Abbe number of the second lens element, $\upsilon 3$ is an Abbe number of the third lens element and $\upsilon 4$ is an Abbe number of the fourth lens element. The optical imaging lens satisfies the relationship: $\upsilon 1+\upsilon 2+\upsilon 3+\upsilon 4 \leq 150.000$.

In the optical imaging lens of the present invention, the embodiments further satisfy any one of the following relationships:

$(G12+T2)/(T1+G23) \leq 2.500$.  1.

$TL/(T1+G23) \leq 5.500$.  2.

$TTL/(G23+T4) \leq 5.000$.  3.

$TL/(G23+T4) \leq 3.500$.  4.

$TTL/(T1+G23) \leq 5.500$.  5.

$TL/T3 \leq 5.500$.  6.

$(G12+T2)/(T1+G34) \leq 2.500$.  7.

$TL/(G34+T4) \leq 5.000$.  8.

$TL/(T1+G34) \geq 4.500$.  9.

| | |
|---|---|
| $TL/T4 \leq 6.500.$ | 10. |
| $TTL/T1 \leq 8.000.$ | 11. |
| $ALT/T1 \leq 5.600.$ | 12. |
| $(G12+T2)/T1 \leq 2.500.$ | 13. |
| $TTL/(G34+T4) \leq 4.500.$ | 14. |
| $ALT/(G34+T4) \leq 3.000.$ | 15. |
| $TTL/BFL \geq 5.000.$ | 16. |
| $ALT/AAG \geq 4.000.$ | 17. |

T1 is a thickness of the first lens element along the optical axis, T2 is a thickness of the second lens element along the optical axis, T3 is a thickness of the third lens element along the optical axis, T4 is a thickness of the fourth lens element along the optical axis, G12 is an air gap between the first lens element and the second lens element along the optical axis, G23 is an air gap between the second lens element and the third lens element along the optical axis, and G34 is an air gap between the third lens element and the fourth lens element along the optical axis.

TL is a distance from the object-side surface of the first lens element to the image-side surface of the fourth lens element along the optical axis, TTL is a distance from the object-side surface of the first lens element to an image plane along the optical axis, ALT is a sum of thickness of all the four lens elements along the optical axis, BFL is a distance from the image-side surface of the fourth lens element to an image plane along the optical axis, and AAG is a sum of three air gaps from the first lens element to the fourth lens element along the optical axis.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 12 illustrates a fourth embodiment of the optical imaging lens of the present invention.

FIG. 13A illustrates the longitudinal spherical aberration on the image plane of the fourth embodiment.

FIG. 13B illustrates the field curvature aberration on the sagittal direction of the fourth embodiment.

FIG. 13C illustrates the field curvature aberration on the tangential direction of the fourth embodiment.

FIG. 13D illustrates the distortion aberration of the fourth embodiment.

FIG. 18 illustrates a seventh embodiment of the optical imaging lens of the present invention.

FIG. 19A illustrates the longitudinal spherical aberration on the image plane of the seventh embodiment.

FIG. 19B illustrates the field curvature aberration on the sagittal direction of the seventh embodiment.

FIG. 19C illustrates the field curvature aberration on the tangential direction of the seventh embodiment.

FIG. 19D illustrates the distortion aberration of the seventh embodiment.

FIG. 26 shows the optical data of the first embodiment of the optical imaging lens.

FIG. 27 shows the aspheric surface data of the first embodiment.

FIG. 28 shows the optical data of the second embodiment of the optical imaging lens.

FIG. 29 shows the aspheric surface data of the second embodiment.

FIG. 30 shows the optical data of the third embodiment of the optical imaging lens.

FIG. 31 shows the aspheric surface data of the third embodiment.

FIG. 32 shows the optical data of the fourth embodiment of the optical imaging lens.

FIG. 33 shows the aspheric surface data of the fourth embodiment.

FIG. 34 shows the optical data of the fifth embodiment of the optical imaging lens.

FIG. 35 shows the aspheric surface data of the fifth embodiment.

FIG. 36 shows the optical data of the sixth embodiment of the optical imaging lens.

FIG. 37 shows the aspheric surface data of the sixth embodiment.

FIG. 38 shows the optical data of the seventh embodiment of the optical imaging lens.

FIG. 39 shows the aspheric surface data of the seventh embodiment.

FIG. 40 shows the optical data of the eighth embodiment of the optical imaging lens.

FIG. 41 shows the aspheric surface data of the eighth embodiment.

FIG. 42 shows the optical data of the ninth embodiment of the optical imaging lens.

FIG. 43 shows the aspheric surface data of the ninth embodiment.

FIG. 44 shows the optical data of the tenth embodiment of the optical imaging lens.

FIG. 45 shows the aspheric surface data of the tenth embodiment.

FIG. 46 shows some important parameters in the embodiments.

FIG. 47 shows some important ratios in the embodiments.

DETAILED DESCRIPTION

Figure 1:
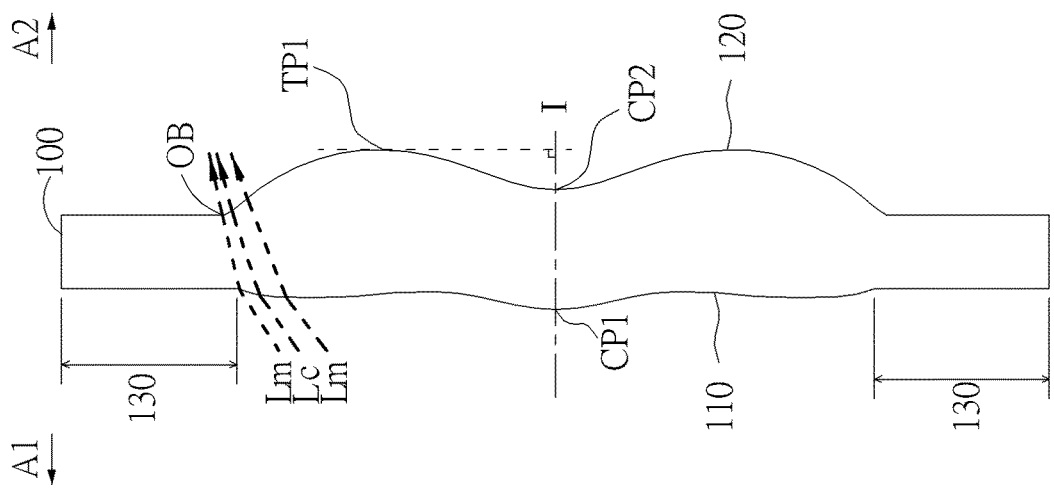

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
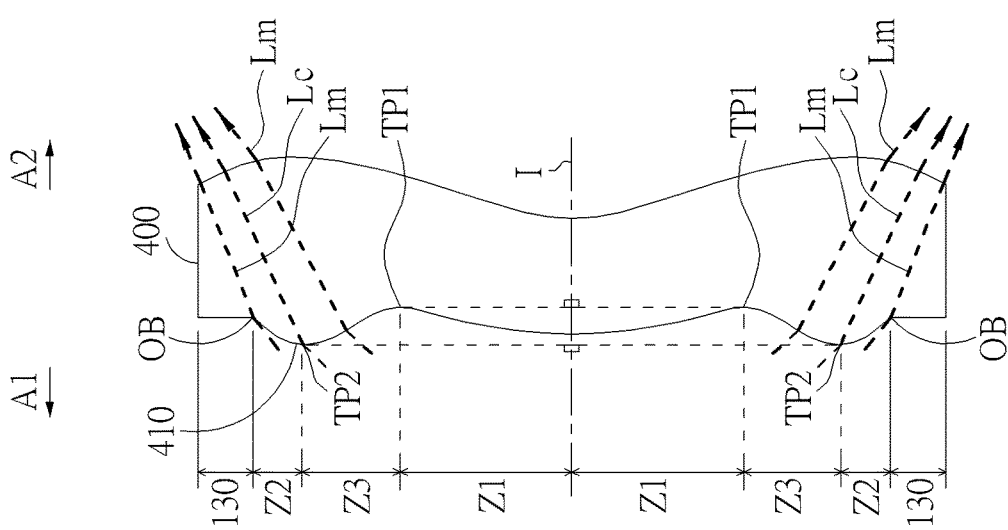

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the $N^{th}$ transition point (farthest from the optical axis I).

The region of a surface of the lens element from the central point to the first transition point TP1 is defined as the optical axis region, which includes the central point. The region located radially outside of the farthest $N^{th}$ transition point from the optical axis I to the optical boundary OB of the surface of the lens element is defined as the periphery region. In some embodiments, there may be intermediate regions present between the optical axis region and the periphery region, with the number of intermediate regions depending on the number of the transition points.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
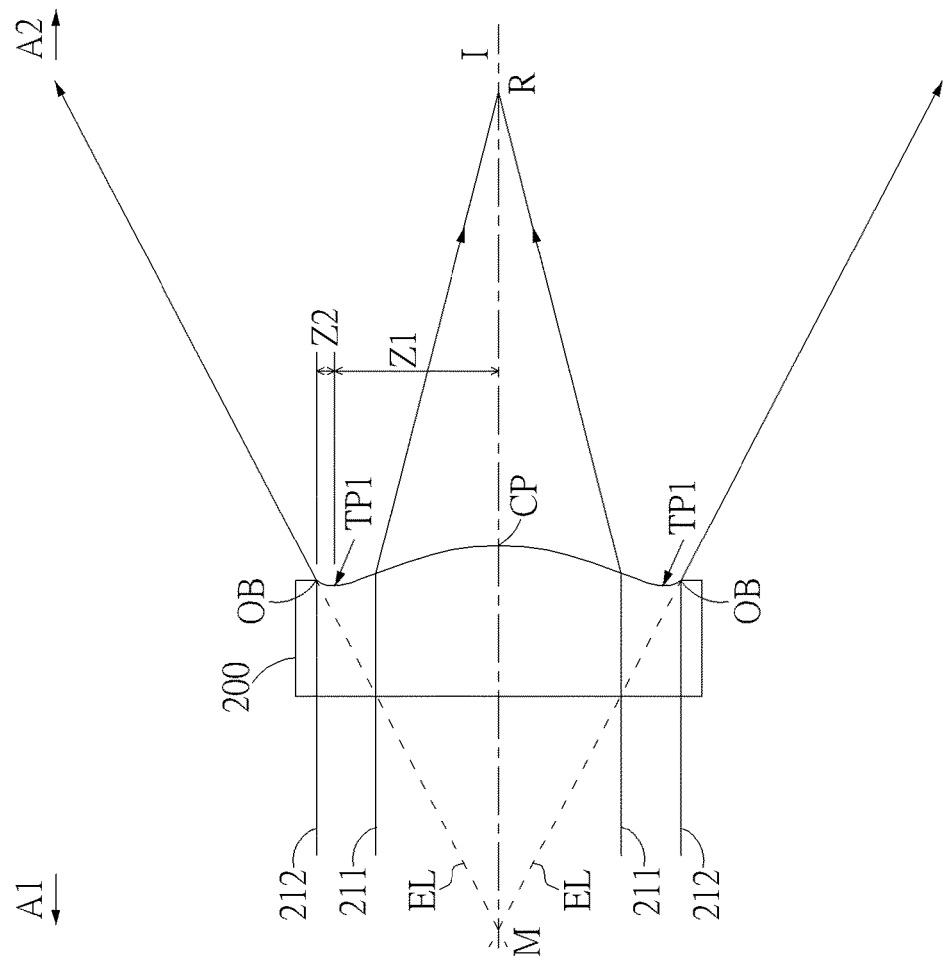
FIGS. 1-5 illustrate the methods for determining the surface shapes and for determining an optical-axis region and a periphery region of one lens element.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex- (concave-) region," can be used alternatively.

Figure 5:
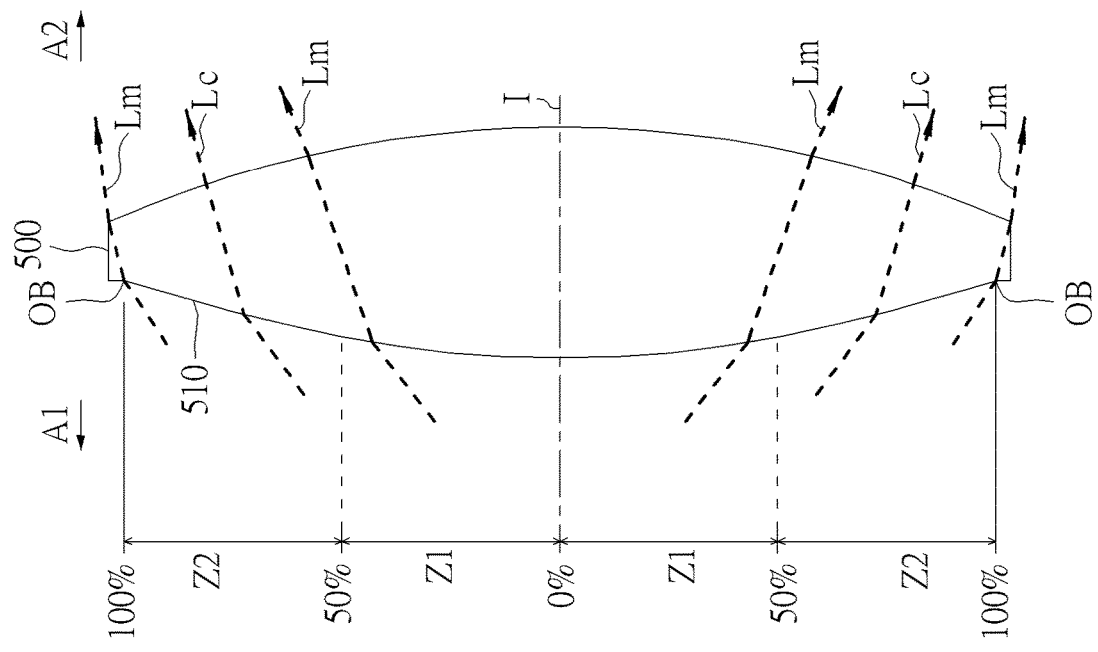
Figure 3:
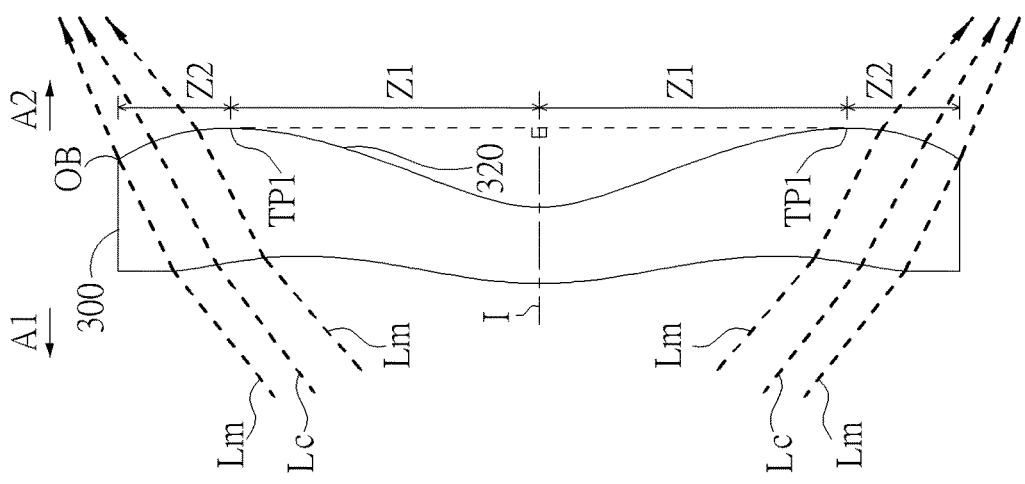

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region between 0-50% of the distance between the optical axis I and the optical boundary OB of the surface of the lens element and the periphery region is defined as the region between 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

Figure 6:
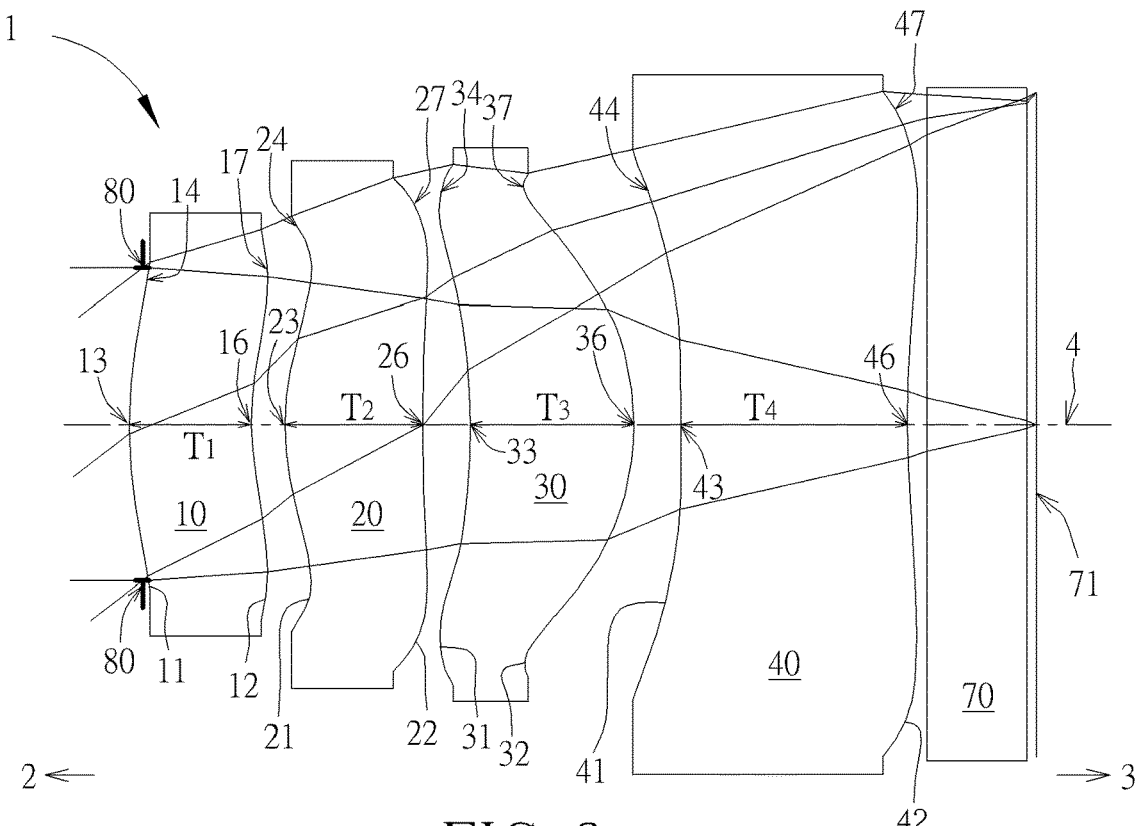
FIG. 6 illustrates a first embodiment of the optical imaging lens of the present invention.

As shown in FIG. 6, the optical imaging lens 1 of four lens elements of the present invention, sequentially located from an object side 2 (where an object is located) to an image side 3 along an optical axis 4, has an aperture stop (ape. stop) 80, a first lens element 10, a second lens element 20, a third lens element 30, a fourth lens element 40, a filter 70 and an image plane 71. Generally speaking, the first lens element 10, the second lens element 20, the third lens element 30 and the fourth lens element 40 may be made of a transparent plastic material but the present invention is not limited to this. Each lens element has an appropriate refracting power. In the present invention, the lens elements having refracting power included by the optical imaging lens 1 are only the four lens elements, i.e. the first lens element 10, the second lens element 20, the third lens element 30 and the fourth lens element 40, as described above. The optical axis 4 is the optical axis of the entire optical imaging lens 1, and the optical axis 4 of each of the lens elements coincides with the optical axis 4 of the optical imaging lens 1.

Furthermore, the optical imaging lens 1 of the present invention includes an aperture stop (ape. stop) 80 disposed in an appropriate position. In FIG. 6, the aperture stop 80 is disposed between the object side 2 and the first lens element 10. When light emitted or reflected by an object (not shown) which is located at the object side 2 enters the optical imaging lens 1 of the present invention, it forms a clear and sharp image on the image plane 71 at the image side 3 after passing through the aperture stop 80, the first lens element 10, the second lens element 20, the third lens element 30, the fourth lens element 40 and the filter 70. In the embodiments of the present invention, the filter 70 is disposed between the image-side surface 42 of the fourth lens element 40 facing toward the image side 3 and the image plane 71. In one embodiment of the present invention, the filter 70 may be a filter of various suitable functions, for example, to allow light of specific wavelength to pass through.

Each lens element in the optical imaging lens 1 of the present invention has an object-side surface facing toward the object side 2 and allowing imaging rays to pass through as well as an image-side surface facing toward the image side 3 and allowing the imaging rays to pass through. In addition, each object-side surface and image-side surface in the optical imaging lens 1 of the present invention has an optical-axis region and a periphery region. For example, the first lens element 10 has an object-side surface 11 and an image-side surface 12; the second lens element 20 has an object-side surface 21 and an image-side surface 22; the third lens element 30 has an object-side surface 31 and an image-side surface 32; the fourth lens element 40 has an object-side surface 41 and an image-side surface 42.

Each lens element in the optical imaging lens 1 of the present invention further has a thickness T along the optical axis 4. For example, the first lens element 10 has a first lens element thickness T1 along the optical axis 4, the second lens element 20 has a second lens element thickness T2 along the optical axis 4, the third lens element 30 has a third lens element thickness T3 along the optical axis 4 and the fourth lens element 40 has a fourth lens element thickness T4 along the optical axis 4. Therefore, the sum of the thickness of all the four lens elements in the optical imaging lens 1 along the optical axis 4 is ALT=T1+T2+T3+T4.

In addition, between two adjacent lens elements in the optical imaging lens 1 of the present invention there may be an air gap along the optical axis 4. For example, there is an air gap G12 disposed between the first lens element 10 and the second lens element 20 along the optical axis 4, an air gap G23 disposed between the second lens element 20 and the third lens element 30 along the optical axis 4, and an air gap G34 disposed between the third lens element 30 and the fourth lens element 40 along the optical axis 4. Therefore, the sum of three air gaps from the first lens element 10 to the fourth lens element 40 along the optical axis 4 is AAG=G12+G23+G34.

In addition, the distance from the object-side surface 11 of the first lens element 10 to the image plane 71, namely the total length of the optical imaging lens 1 along the optical axis 4 is TTL; the effective focal length of the optical imaging lens 1 is EFL; the distance from the image-side surface 42 of fourth lens element 40 to the image plane 71 along the optical axis 4 is BFL; the distance from the object-side surface 11 of the first lens element 10 to the image-side surface 42 of the fourth lens element 40 along the optical axis 4 is TL.

The air gap between the image-side surface 42 of the fourth lens element 40 and the filter 70 along the optical axis 4 is G4F; the thickness of the filter 70 along the optical axis 4 is TF; the air gap between the filter 70 and the image plane 71 along the optical axis 4 is GFP; and the distance from the image-side surface 42 of the fourth lens element 40 to the image plane 71 along the optical axis 4 is BFL. Therefore, BFL=G4F+TF+GFP.

Furthermore, the focal length of the first lens element 10 is f1; the focal length of the second lens element 20 is f2; the focal length of the third lens element 30 is f3; the focal length of the fourth lens element 40 is f4; the refractive index of the first lens element 10 is n1; the refractive index of the second lens element 20 is n2; the refractive index of the third lens element 30 is n3; the refractive index of the fourth lens element 40 is n4; the Abbe number of the first lens element 10 is υ1; the Abbe number of the second lens element 20 is υ2; the Abbe number of the third lens element 30 is υ3; and the Abbe number of the fourth lens element 40 is υ4.

First Embodiment

Figure 7A:
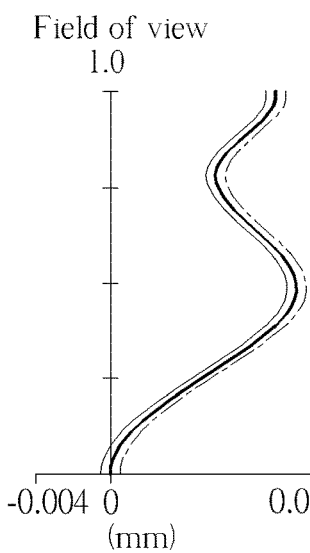
FIG. 7A illustrates the longitudinal spherical aberration on the image plane of the first embodiment.
Figure 7B:
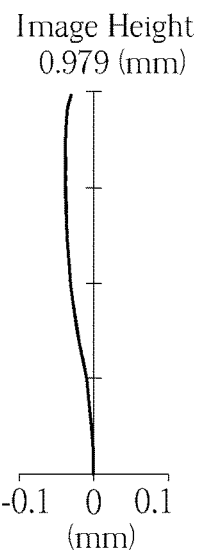
FIG. 7B illustrates the field curvature aberration on the sagittal direction of the first embodiment.
Figure 7C:
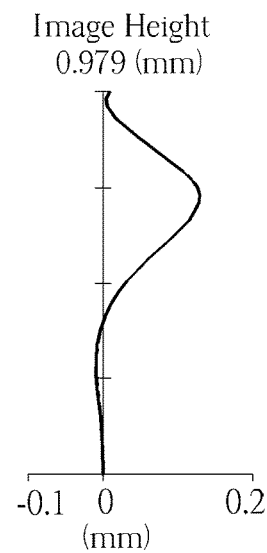
FIG. 7C illustrates the field curvature aberration on the tangential direction of the first embodiment.
Figure 7D:
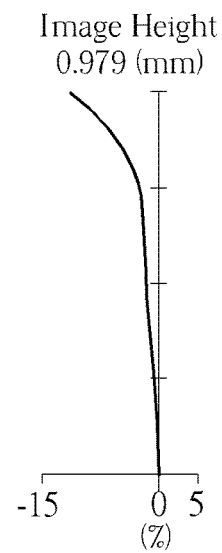
FIG. 7D illustrates the distortion aberration of the first embodiment.

Please refer to FIG. 6 which illustrates the first embodiment of the optical imaging lens 1 of the present invention. Please refer to FIG. 7A for the longitudinal spherical aberration on the image plane 71 of the first embodiment; please refer to FIG. 7B for the field curvature aberration on the sagittal direction; please refer to FIG. 7C for the field curvature aberration on the tangential direction; and please refer to FIG. 7D for the distortion aberration. The Y axis of the spherical aberration in each embodiment is "field of view" for 1.0. The Y axis of the field curvature aberration and the distortion aberration in each embodiment stands for the "image height", IMH, which is 0.979 mm.

The optical imaging lens 1 of the first embodiment exclusively has four lens elements 10, 20, 30 and 40 with refracting power. The optical imaging lens 1 also has an aperture stop 80, a filter 70 and an image plane 71. The aperture stop 80 is provided between the object side 2 and the first lens element 10. The filter 70 may be used for preventing light of specific wavelength reaching the image plane 71 to adversely affect the imaging quality.

The first lens element 10 has negative refracting power. An optical-axis region 13 of the object-side surface 11 facing toward the object side 2 is convex, and a periphery region 14 of the object-side surface 11 facing toward the object side 2 is convex. An optical-axis region 16 of the image-side surface 12 facing toward the image side 3 is concave, and a periphery region 17 of the image-side surface 12 facing toward the image side 3 is convex. Besides, both the object-side surface 11 and the image-side 12 of the first lens element 10 are aspherical surfaces.

The second lens element 20 has positive refracting power. An optical-axis region 23 of the object-side surface 21 facing toward the object side 2 is convex, and a periphery region 24 of the object-side surface 21 facing toward the object side 2 is concave. An optical-axis region 26 of the image-side surface 22 facing toward the image side 3 is concave, and a periphery region 27 of the image-side surface 22 facing toward the image side 3 is convex. Besides, both the object-side surface 21 and the image-side 22 of the second lens element 20 are aspherical surfaces.

The third lens element 30 has positive refracting power. An optical-axis region 33 of the object-side surface 31 facing toward the object side 2 is concave, and a periphery region 34 of the object-side surface 31 facing toward the object side 2 is convex. An optical-axis region 36 of the image-side surface 32 facing toward the image side 3 is convex, and a periphery region 37 of the image-side surface 32 facing toward the image side 3 is concave. Besides, both the object-side surface 31 and the image-side 32 of the third lens element 30 are aspherical surfaces.

The fourth lens element 40 has negative refracting power. An optical-axis region 43 of the object-side surface 41 facing toward the object side 2 is convex, and a periphery region 44 of the object-side surface 41 facing toward the object side 2 is concave. An optical-axis region 46 of the image-side surface 42 facing toward the image side 3 is concave, and a periphery region 47 of the image-side surface 42 facing toward the image side 3 is convex. Besides, both the object-side surface 41 and the image-side 42 of the fourth lens element 40 are aspherical surfaces.

In the first lens element 10, the second lens element 20, the third lens element 30 and the fourth lens element 40 of the optical imaging lens element 1 of the present invention, there are 8 surfaces, such as the object-side surfaces 11/21/31/41 and the image-side surfaces 12/22/32/42. If a surface is aspherical, these aspheric coefficients are defined according to the following formula:

$$X(Y) = \frac{Y^2}{R} \bigg/ \left(1 + \sqrt{1 - (1+K)\frac{Y^2}{R^2}}\right) + \sum_{i=1}^{n} a_i \times Y^i$$

In which:

R represents the curvature radius of a lens element surface close to the optical axis 4;

Z represents the depth of an aspherical surface (the perpendicular distance between the point of the aspherical surface at a distance Y from the optical axis 4 and the tangent plane of the vertex on the optical axis 4 of the aspherical surface);

Y represents a distance from a point on the aspherical surface to the optical axis 4;

K is a conic constant; and $a_i$ is the aspheric coefficient of the $i^{th}$ order.

The optical data of the first embodiment of the optical imaging lens 1 are shown in FIG. 26 while the aspheric surface data are shown in FIG. 27. In the following embodiments of the optical imaging lens, the f-number of the entire optical imaging lens element system is Fno, EFL is the effective focal length, HFOV stands for the half field of view which is half of the field of view of the entire optical imaging lens system, and the unit for the radius, the thickness and the focal length is in millimeters (mm). In this embodiment, TTL=2.737 mm; EFL=1.440 mm; HFOV=37.500 degrees; the image height=0.979 mm; Fno=1.526.

Second Embodiment

Figure 8:
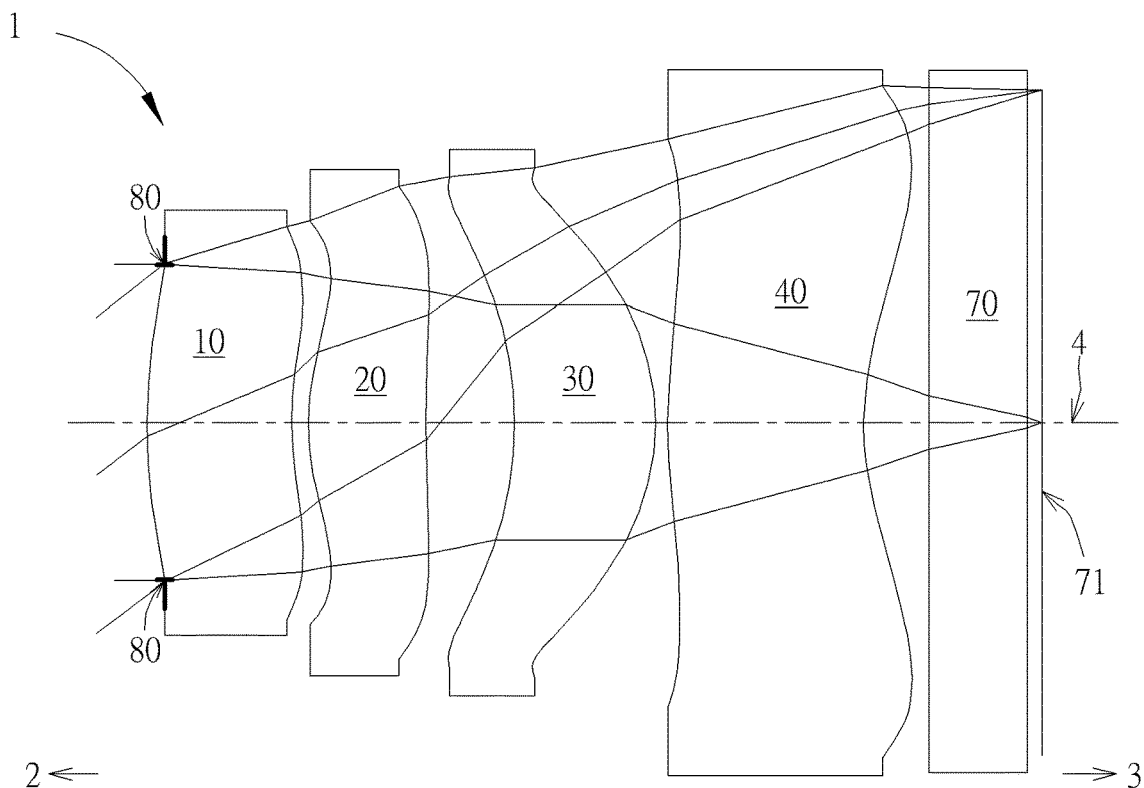
FIG. 8 illustrates a second embodiment of the optical imaging lens of the present invention.
Figures 9A, 9B, 9C, 9D:
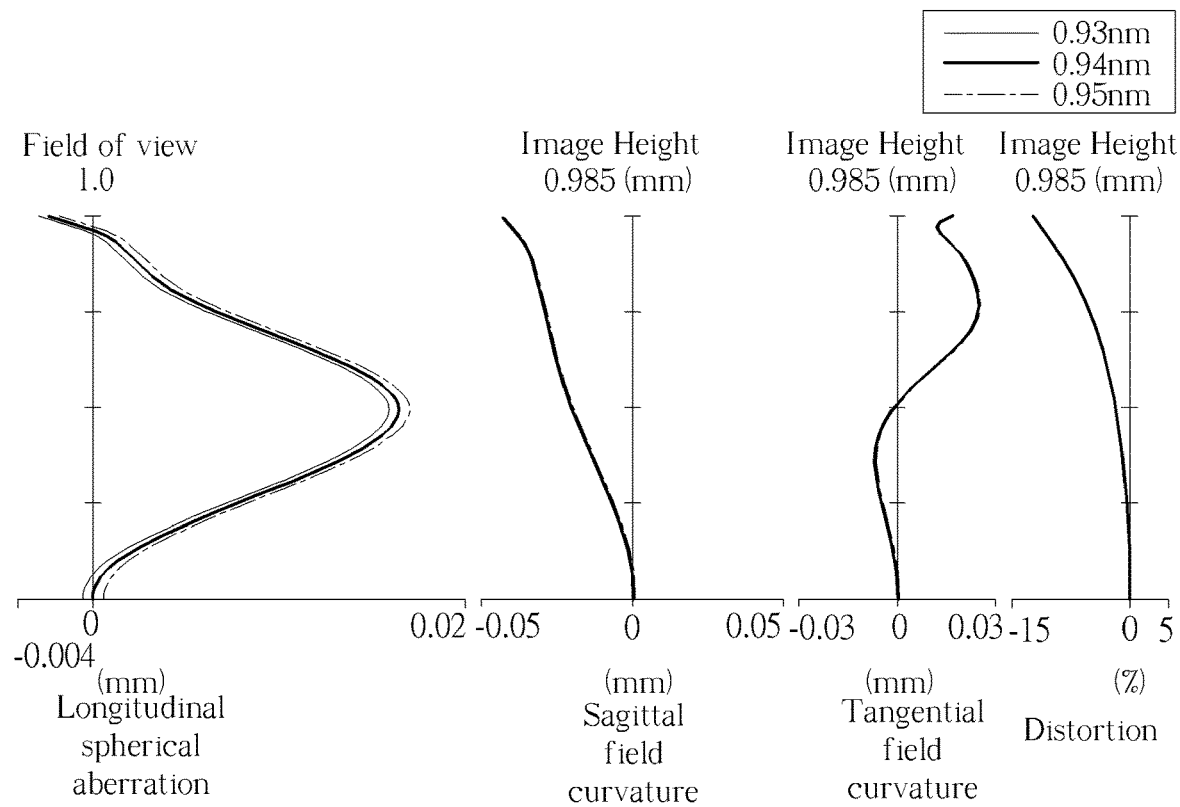
FIG. 9A illustrates the longitudinal spherical aberration on the image plane of the second embodiment.
FIG. 9B illustrates the field curvature aberration on the sagittal direction of the second embodiment.
FIG. 9C illustrates the field curvature aberration on the tangential direction of the second embodiment.
FIG. 9D illustrates the distortion aberration of the second embodiment.

Please refer to FIG. 8 which illustrates the second embodiment of the optical imaging lens 1 of the present invention. It is noted that from the second embodiment to the following embodiments, in order to simplify the figures, only the components different from what the first embodiment has, and the basic lens elements will be labeled in figures. Other components that are the same as what the first embodiment has, such as the object-side surface, the image-side surface, the optical-axis region and the periphery region will be omitted in the following embodiments. Please refer to FIG. 9A for the longitudinal spherical aberration on the image plane 71 of the second embodiment, please refer to FIG. 9B for the field curvature aberration on the sagittal direction, please refer to FIG. 9C for the field curvature aberration on the tangential direction, and please refer to FIG. 9D for the distortion aberration. The components in this embodiment are similar to those in the first embodiment, but the optical data such as the refracting power of a lens element, the radius, the lens thickness, the aspheric coefficient of a lens element or the back focus in this embodiment are different from the optical data in the first embodiment.

The optical data of the second embodiment of the optical imaging lens are shown in FIG. 28 while the aspheric surface data are shown in FIG. 29. In this embodiment, TTL=2.652 mm; EFL=1.466 mm; HFOV=37.500 degrees; the image height=0.985 mm; Fno=1.553. In particular, 1. TTL of the optical imaging lens in this example is shorter than that of the optical imaging lens in the first example, and 2. the fabrication of this embodiment is easier than that of the first embodiment so the yield is better.

Third Embodiment

Figure 10:
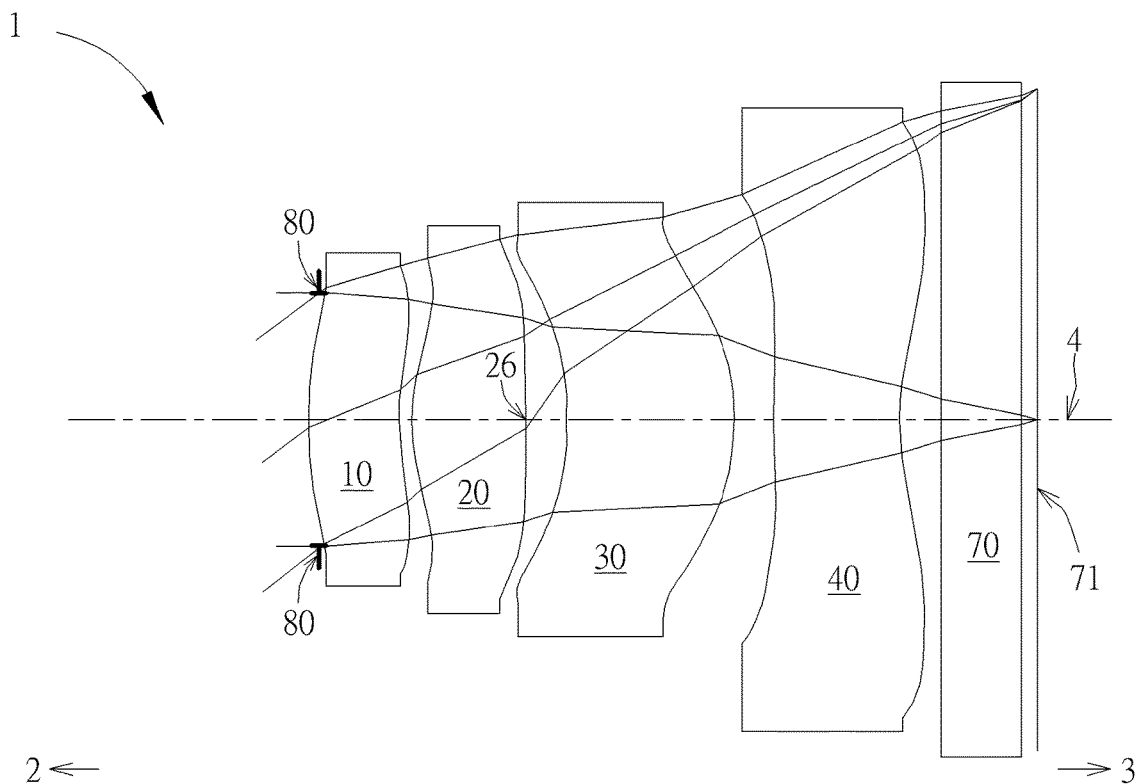
FIG. 10 illustrates a third embodiment of the optical imaging lens of the present invention.
Figures 11A, 11B, 11C, 11D:
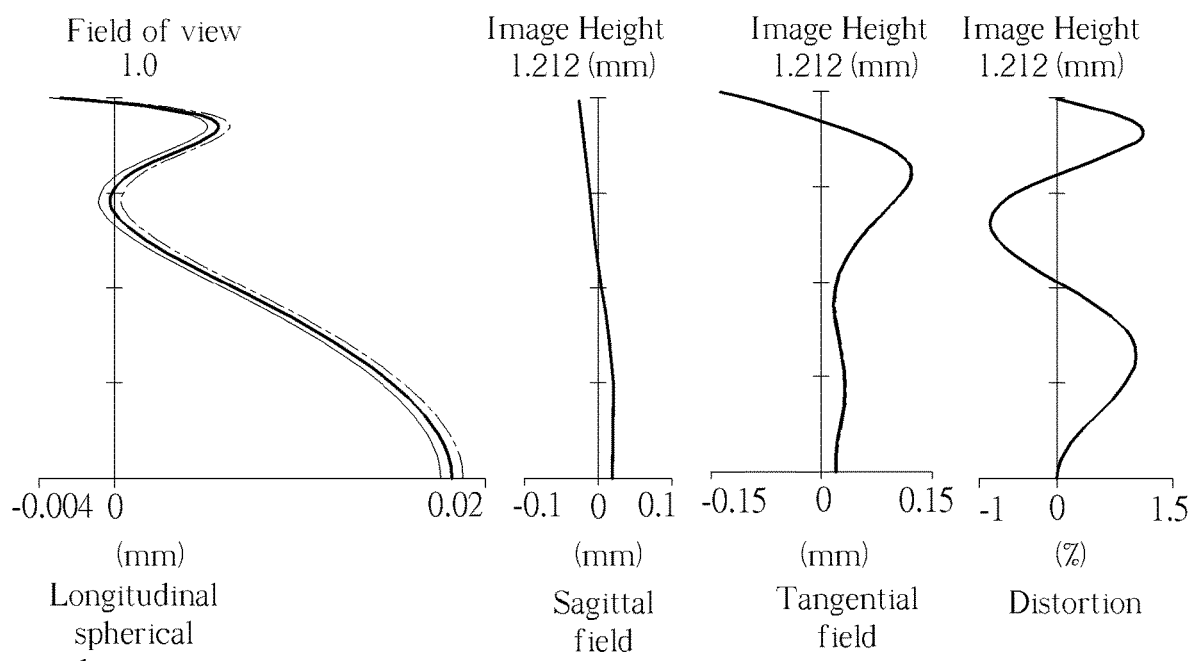
FIG. 11A illustrates the longitudinal spherical aberration on the image plane of the third embodiment.
FIG. 11B illustrates the field curvature aberration on the sagittal direction of the third embodiment.
FIG. 11C illustrates the field curvature aberration on the tangential direction of the third embodiment.
FIG. 11D illustrates the distortion aberration of the third embodiment.

Please refer to FIG. 10 which illustrates the third embodiment of the optical imaging lens 1 of the present invention. Please refer to FIG. 11A for the longitudinal spherical aberration on the image plane 71 of the third embodiment; please refer to FIG. 11B for the field curvature aberration on the sagittal direction; please refer to FIG. 11C for the field curvature aberration on the tangential direction; and please refer to FIG. 11D for the distortion aberration. The components in this embodiment are similar to those in the first embodiment, but the optical data such as the refracting power of a lens element, the radius, the lens thickness, the aspheric coefficient of a lens element or the back focus in this embodiment are different from the optical data in the first embodiment. Besides, in this embodiment, the optical-axis region 26 of the image-side surface 22 facing toward the image side 3 of the second lens element 20 is convex.

The optical data of the third embodiment of the optical imaging lens are shown in FIG. 30 while the aspheric surface data are shown in FIG. 31. In this embodiment, TTL=2.700 mm; EFL=1.597 mm; HFOV=37.500 degrees; the image height=1.212 mm; Fno=1.692. In particular, 1. TTL of the optical imaging lens in this example is shorter than that of the optical imaging lens in the first example, 2. the distortion aberration of the optical imaging lens in this embodiment are better than those of the optical imaging lens in the first embodiment, and 3. the fabrication of this embodiment is easier than that of the first embodiment so the yield is better.

Fourth Embodiment

Please refer to FIG. 12 which illustrates the fourth embodiment of the optical imaging lens 1 of the present invention. Please refer to FIG. 13A for the longitudinal spherical aberration on the image plane 71 of the fourth embodiment; please refer to FIG. 13B for the field curvature aberration on the sagittal direction; please refer to FIG. 13C for the field curvature aberration on the tangential direction; and please refer to FIG. 13D for the distortion aberration. The components in this embodiment are similar to those in the first embodiment, but the optical data such as the refracting power of a lens element, the radius, the lens thickness, the aspheric coefficient of a lens element or the back focus in this embodiment are different from the optical data in the first embodiment. Besides, in this embodiment, the periphery region 34 of the object-side surface 31 facing toward the object side 2 of the third lens element 30 is concave.

The optical data of the fourth embodiment of the optical imaging lens are shown in FIG. 32 while the aspheric surface data are shown in FIG. 33. In this embodiment, TTL=2.654 mm; EFL=1.539 mm; HFOV=37.500 degrees; the image height=0.984 mm; Fno=1.630. In particular, 1. TTL of the optical imaging lens in this example is shorter than that of the optical imaging lens in the first example, and 2. the fabrication of this embodiment is easier than that of the first embodiment so the yield is better.

Fifth Embodiment

Figure 14:
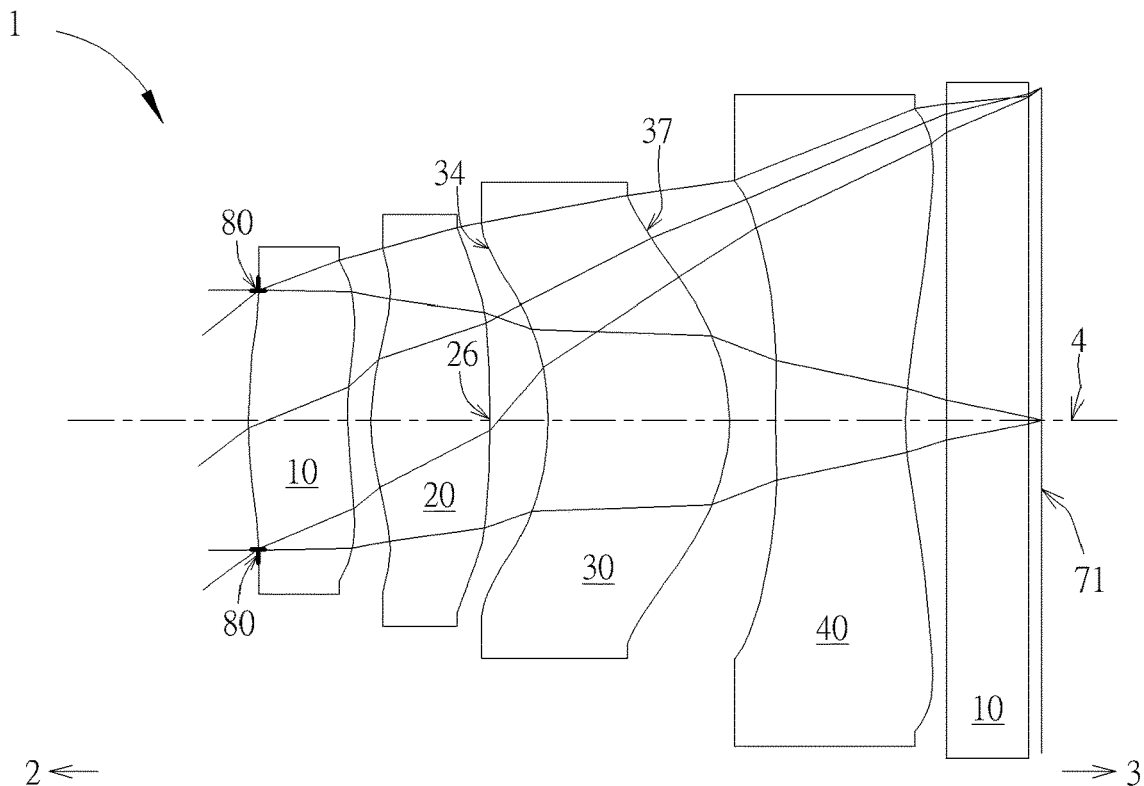
FIG. 14 illustrates a fifth embodiment of the optical imaging lens of the present invention.
Figures 15A, 15B, 15C, 15D:
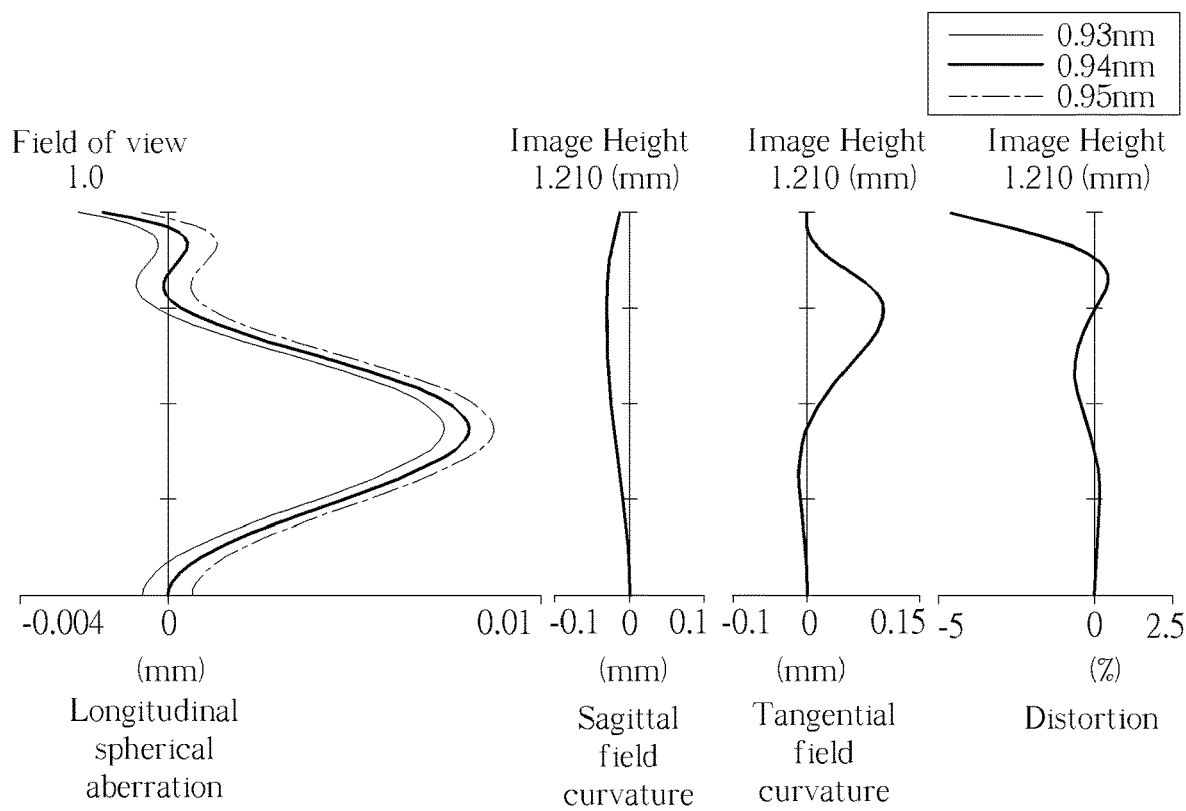
FIG. 15A illustrates the longitudinal spherical aberration on the image plane of the fifth embodiment.
FIG. 15B illustrates the field curvature aberration on the sagittal direction of the fifth embodiment.
FIG. 15C illustrates the field curvature aberration on the tangential direction of the fifth embodiment.
FIG. 15D illustrates the distortion aberration of the fifth embodiment.

Please refer to FIG. 14 which illustrates the fifth embodiment of the optical imaging lens 1 of the present invention. Please refer to FIG. 15A for the longitudinal spherical aberration on the image plane 71 of the fifth embodiment; please refer to FIG. 15B for the field curvature aberration on the sagittal direction; please refer to FIG. 15C for the field curvature aberration on the tangential direction, and please refer to FIG. 15D for the distortion aberration. The components in this embodiment are similar to those in the first embodiment, but the optical data such as the refracting power of a lens element, the radius, the lens thickness, the aspheric coefficient of a lens element or the back focus in this embodiment are different from the optical data in the first embodiment. Besides, in this embodiment, the optical-axis region 26 of the image-side surface 22 facing toward the image side 3 of the second lens element 20 is convex, the periphery region 34 of the object-side surface 31 facing toward the object side 2 of the third lens element 30 is concave, and the periphery region 37 of the image-side surface 32 facing toward the image side 3 of the third lens element 30 is convex.

The optical data of the fifth embodiment of the optical imaging lens are shown in FIG. 34 while the aspheric surface data are shown in FIG. 35. In this embodiment, TTL=2.901 mm; EFL=1.654 mm; HFOV=37.500 degrees; the image height=1.210 mm; Fno=1.753. In particular, 1. the longitudinal spherical aberration, the field curvature aberration on the tangential direction, and the distortion aberration of the optical imaging lens in this embodiment are better than the longitudinal spherical aberration, the field curvature aberration on the tangential direction, and the distortion aberration of the optical imaging lens in the first embodiment, and 2. the fabrication of this embodiment is easier than that of the first embodiment so the yield is better.

Sixth Embodiment

Figure 16:
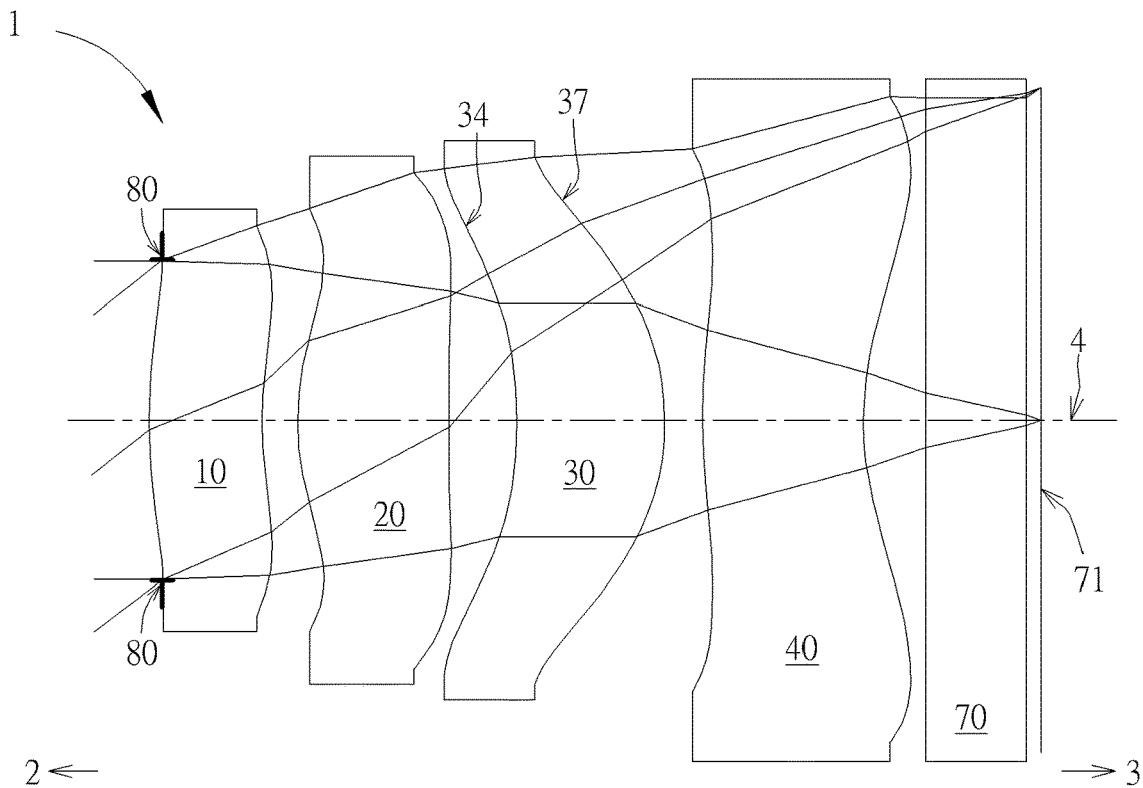
FIG. 16 illustrates a sixth embodiment of the optical imaging lens of the present invention.
Figures 17A, 17B, 17C, 17D:
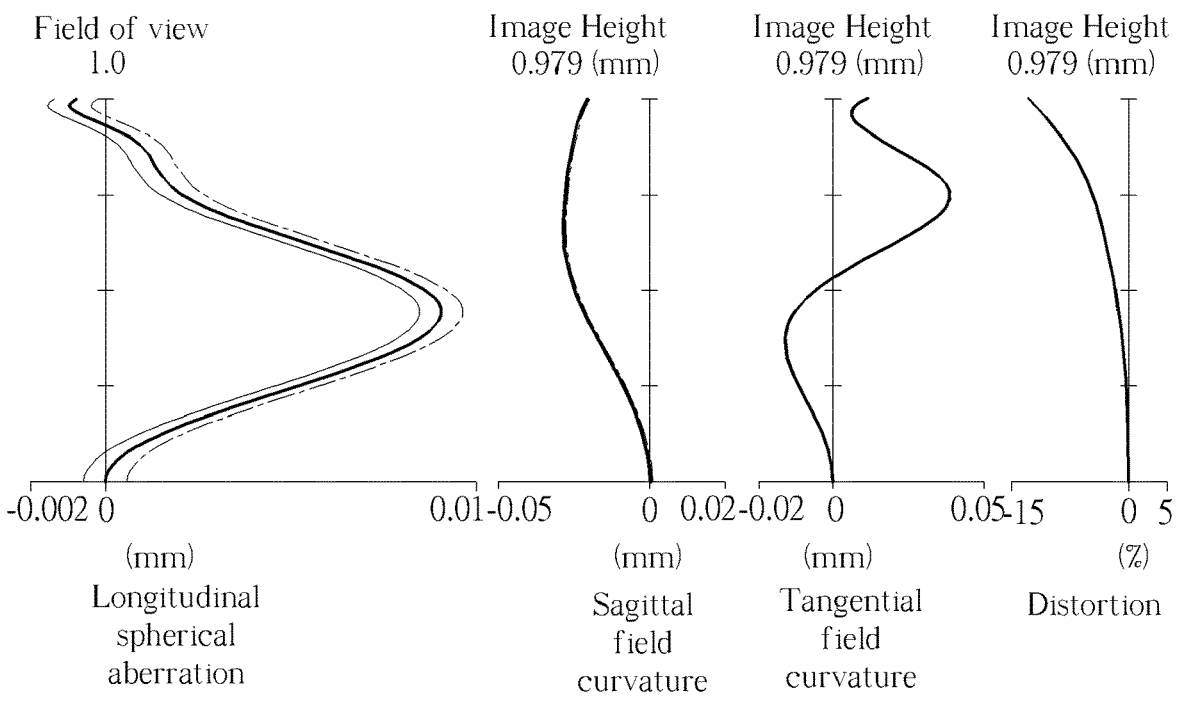
FIG. 17A illustrates the longitudinal spherical aberration on the image plane of the sixth embodiment.
FIG. 17B illustrates the field curvature aberration on the sagittal direction of the sixth embodiment.
FIG. 17C illustrates the field curvature aberration on the tangential direction of the sixth embodiment.
FIG. 17D illustrates the distortion aberration of the sixth embodiment.

Please refer to FIG. 16 which illustrates the sixth embodiment of the optical imaging lens 1 of the present invention. Please refer to FIG. 17A for the longitudinal spherical aberration on the image plane 71 of the sixth embodiment; please refer to FIG. 17B for the field curvature aberration on the sagittal direction; please refer to FIG. 17C for the field curvature aberration on the tangential direction, and please refer to FIG. 17D for the distortion aberration. The components in this embodiment are similar to those in the first embodiment, but the optical data such as the refracting power of a lens element, the radius, the lens thickness, the aspheric coefficient of a lens element or the back focus in this embodiment are different from the optical data in the first embodiment. Besides, in this embodiment, the periphery region 34 of the object-side surface 31 facing toward the object side 2 of the third lens element 30 is concave, and the periphery region 37 of the image-side surface 32 facing toward the image side 3 of the third lens element 30 is convex.

The optical data of the sixth embodiment of the optical imaging lens are shown in FIG. 36 while the aspheric surface data are shown in FIG. 37. In this embodiment, TTL=2.642 mm; EFL=1.465 mm; HFOV=37.500 degrees; the image height=0.979 mm; Fno=1.552. In particular, 1. TTL of the optical imaging lens in this example is shorter than that of the optical imaging lens in the first example, 2. the longitudinal spherical aberration and the field curvature aberration on the tangential direction of the optical imaging lens in this embodiment are better than the longitudinal spherical aberration and the field curvature aberration on the tangential direction of the optical imaging lens in the first embodiment, and 3. the fabrication of this embodiment is easier than that of the first embodiment so the yield is better.

Seventh Embodiment

Please refer to FIG. 18 which illustrates the seventh embodiment of the optical imaging lens 1 of the present invention. Please refer to FIG. 19A for the longitudinal spherical aberration on the image plane 71 of the seventh embodiment; please refer to FIG. 19B for the field curvature aberration on the sagittal direction; please refer to FIG. 19C for the field curvature aberration on the tangential direction, and please refer to FIG. 19D for the distortion aberration. The components in this embodiment are similar to those in the first embodiment, but the optical data such as the refracting power of a lens element, the radius, the lens thickness, the aspheric coefficient of a lens element or the back focus in this embodiment are different from the optical data in the first embodiment. Besides, in this embodiment, the periphery region 37 of the image-side surface 32 facing toward the image side 3 of the third lens element 30 is convex.

The optical data of the seventh embodiment of the optical imaging lens are shown in FIG. 38 while the aspheric surface data are shown in FIG. 39. In this embodiment, TTL=2.653 mm; EFL=1.475 mm; HFOV=37.500 degrees; the image height=0.984 mm; Fno=1.563. In particular, 1. TTL of the optical imaging lens in this example is shorter than that of the optical imaging lens in the first example, 2. the longitudinal spherical aberration and the field curvature aberration on the sagittal direction of the optical imaging lens in this embodiment are better than the longitudinal spherical aberration and the field curvature aberration on the sagittal direction of the optical imaging lens in the first embodiment, and 3. the fabrication of this embodiment is easier than that of the first embodiment so the yield is better.

Eighth Embodiment

Figure 20:
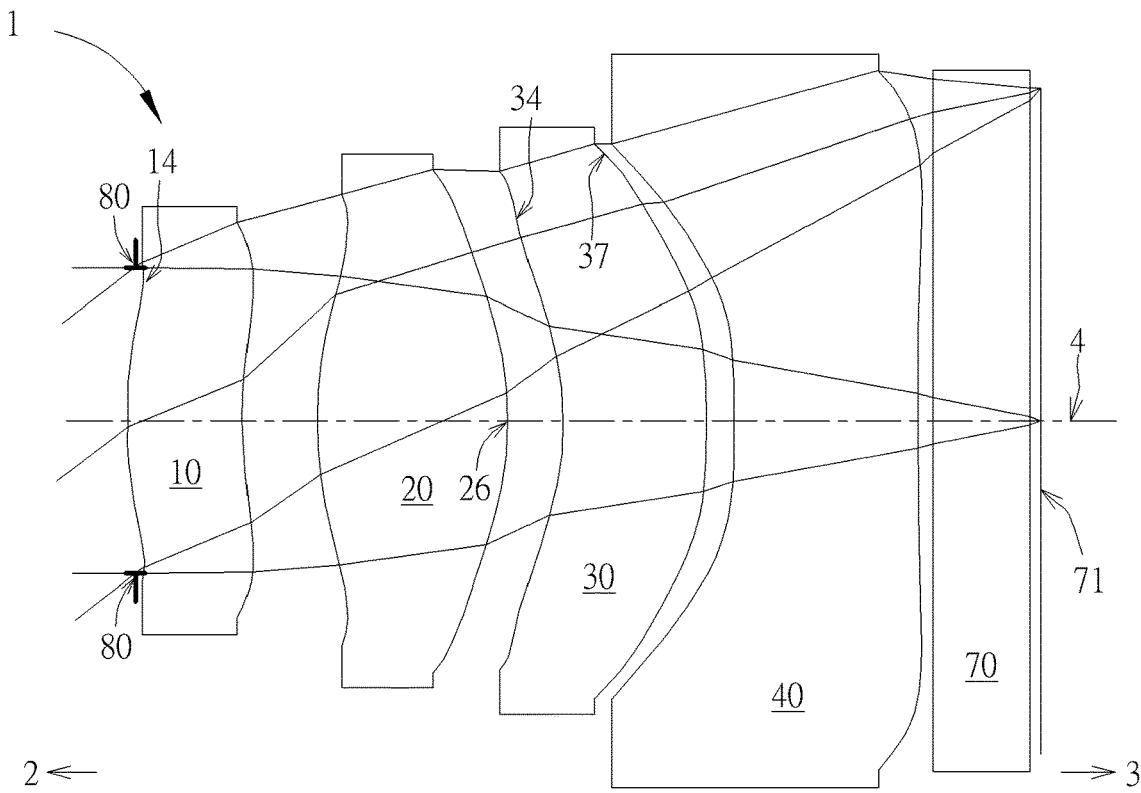
FIG. 20 illustrates an eighth embodiment of the optical imaging lens of the present invention.
Figures 21A, 21B, 21C, 21D:
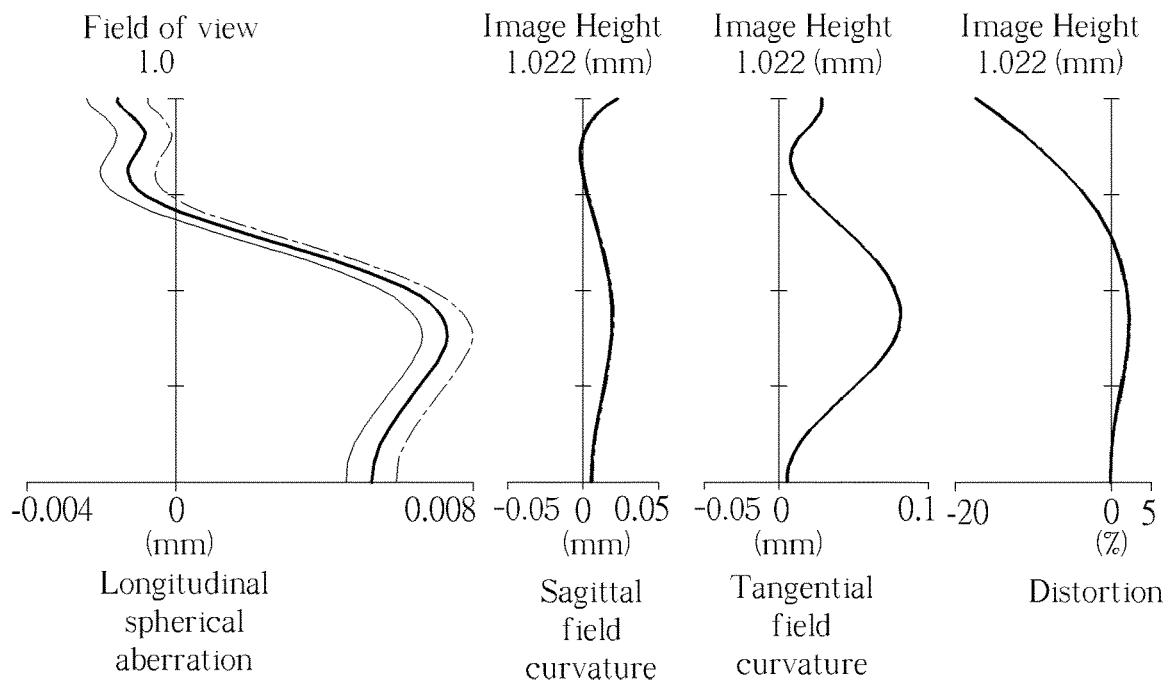
FIG. 21A illustrates the longitudinal spherical aberration on the image plane of the eighth embodiment.
FIG. 21B illustrates the field curvature aberration on the sagittal direction of the eighth embodiment.
FIG. 21C illustrates the field curvature aberration on the tangential direction of the eighth embodiment.
FIG. 21D illustrates the distortion aberration of the eighth embodiment.

Please refer to FIG. 20 which illustrates the eighth embodiment of the optical imaging lens 1 of the present invention. Please refer to FIG. 21A for the longitudinal spherical aberration on the image plane 71 of the eighth embodiment; please refer to FIG. 21B for the field curvature aberration on the sagittal direction; please refer to FIG. 21C for the field curvature aberration on the tangential direction, and please refer to FIG. 21D for the distortion aberration. The components in this embodiment are similar to those in the first embodiment, but the optical data such as the refracting power of a lens element, the radius, the lens thickness, the aspheric coefficient of a lens element or the back focus in this embodiment are different from the optical data in the first embodiment. Besides, in this embodiment, the periphery region 14 of the object-side surface 11 facing toward the object side 2 of the first lens element 10 is concave, the optical-axis region 26 of the image-side surface 22 facing toward the image side 3 of the second lens element 20 is convex, the third lens element 30 has negative refracting power, the periphery region 34 of the object-side surface 31 facing toward the object side 2 of the third lens element 30 is concave, and the periphery region 37 of the image-side surface 32 facing toward the image side 3 of the third lens element 30 is convex.

The optical data of the eighth embodiment of the optical imaging lens are shown in FIG. 40 while the aspheric surface data are shown in FIG. 41. In this embodiment, TTL=2.810 mm; EFL=1.618 mm; HFOV=37.500 degrees; the image height=1.022 mm; Fno=1.714. In particular, 1. the longitudinal spherical aberration and the field curvature aberration on the tangential direction of the optical imaging lens in this embodiment are better than the longitudinal spherical aberration and the field curvature aberration on the tangential direction of the optical imaging lens in the first embodiment, and 2. the fabrication of this embodiment is easier than that of the first embodiment so the yield is better.

Ninth Embodiment

Figure 22:
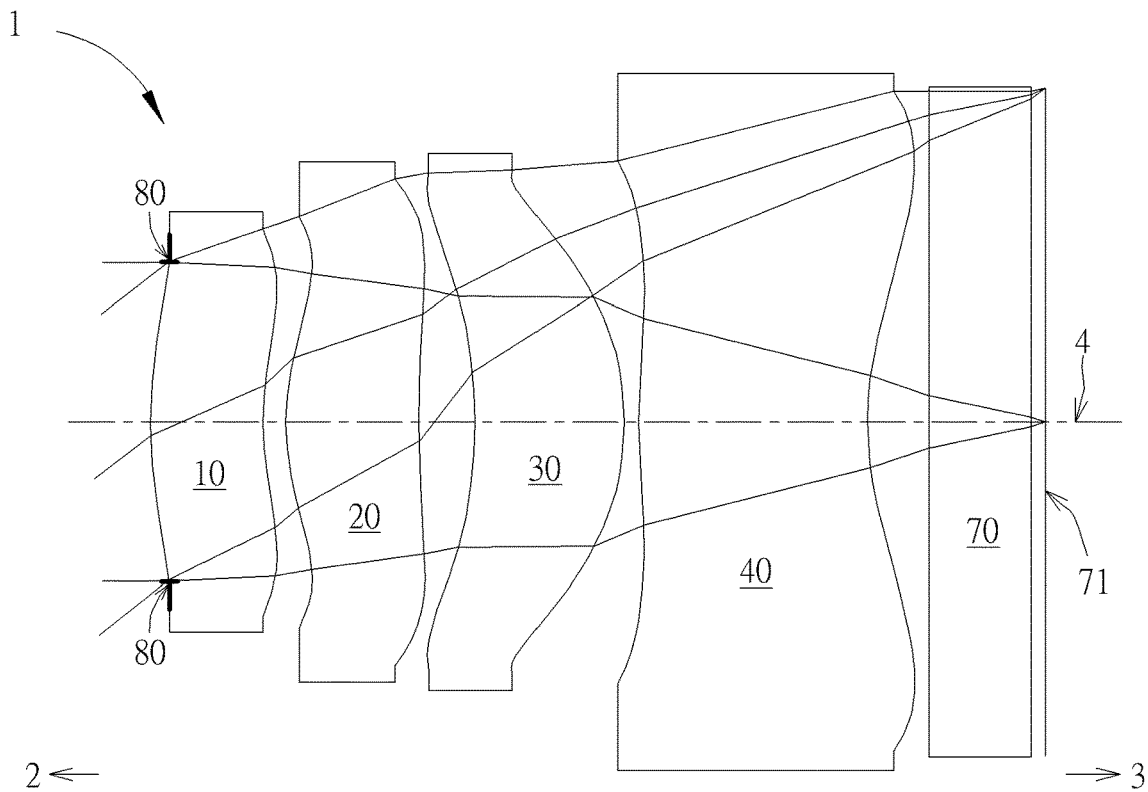
FIG. 22 illustrates a ninth embodiment of the optical imaging lens of the present invention.
Figures 23A, 23B, 23C, 23D:
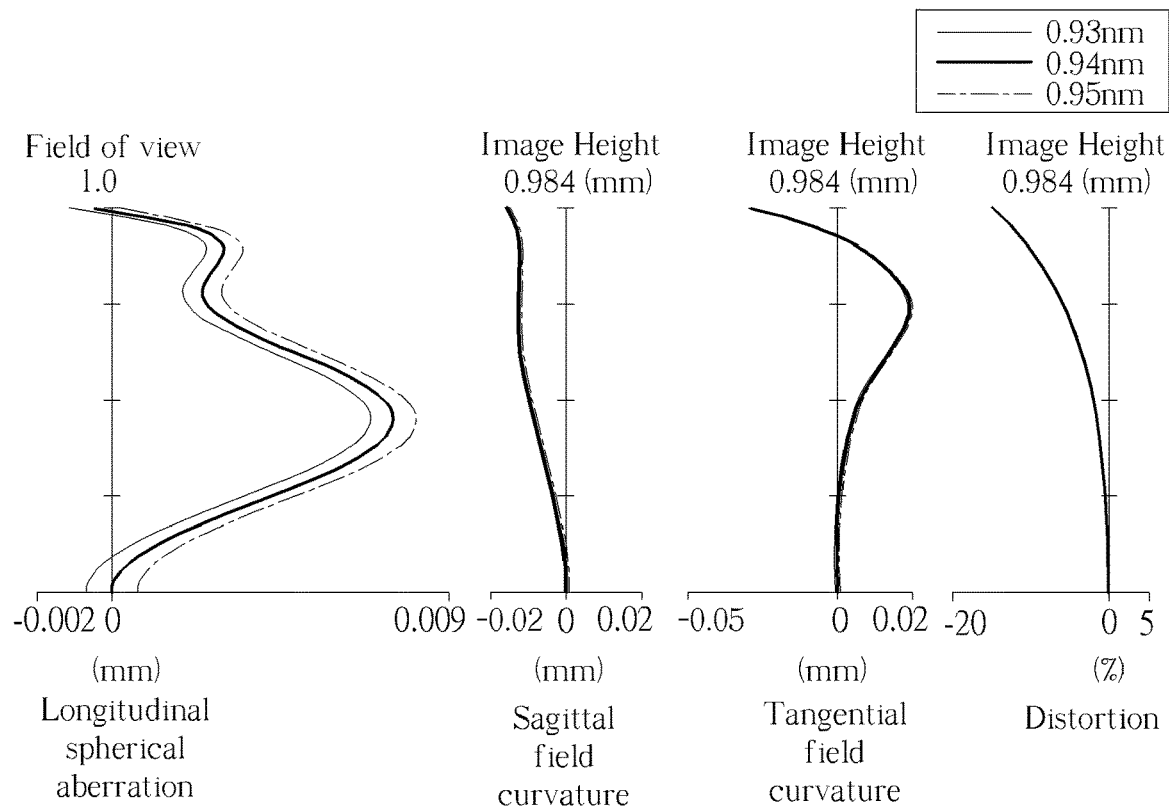
FIG. 23A illustrates the longitudinal spherical aberration on the image plane of the ninth embodiment.
FIG. 23B illustrates the field curvature aberration on the sagittal direction of the ninth embodiment.
FIG. 23C illustrates the field curvature aberration on the tangential direction of the ninth embodiment.
FIG. 23D illustrates the distortion aberration of the ninth embodiment.

Please refer to FIG. 22 which illustrates the ninth embodiment of the optical imaging lens 1 of the present invention. Please refer to FIG. 23A for the longitudinal spherical aberration on the image plane 71 of the ninth embodiment; please refer to FIG. 23B for the field curvature aberration on the sagittal direction; please refer to FIG. 23C for the field curvature aberration on the tangential direction, and please refer to FIG. 23D for the distortion aberration. The components in this embodiment are similar to those in the first embodiment, but the optical data such as the refracting power of a lens element, the radius, the lens thickness, the aspheric coefficient of a lens element or the back focus in this embodiment are different from the optical data in the first embodiment.

The optical data of the ninth embodiment of the optical imaging lens are shown in FIG. 42 while the aspheric surface data are shown in FIG. 43. In this embodiment, TTL=2.654 mm; EFL=1.504 mm; HFOV=37.500 degrees; the image height=0.984 mm; Fno=1.593. In particular, 1. TTL of the optical imaging lens in this example is shorter than that of the optical imaging lens in the first example, 2. the longitudinal spherical aberration and the field curvature aberration on the sagittal direction of the optical imaging lens in this embodiment are better than the longitudinal spherical aberration and the field curvature aberration on the sagittal direction of the optical imaging lens in the first embodiment, and 3. the fabrication of this embodiment is easier than that of the first embodiment so the yield is better.

Tenth Embodiment

Figure 24:
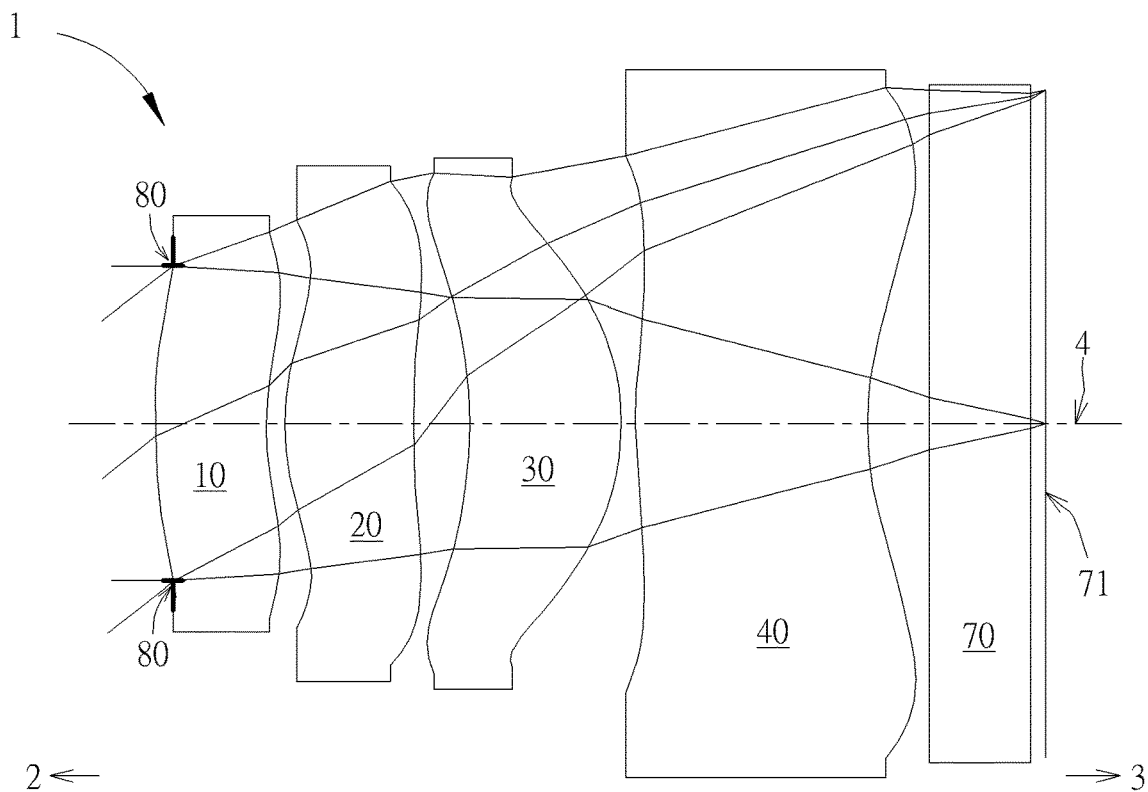
FIG. 24 illustrates a tenth embodiment of the optical imaging lens of the present invention.
Figures 25A, 25B, 25C, 25D:
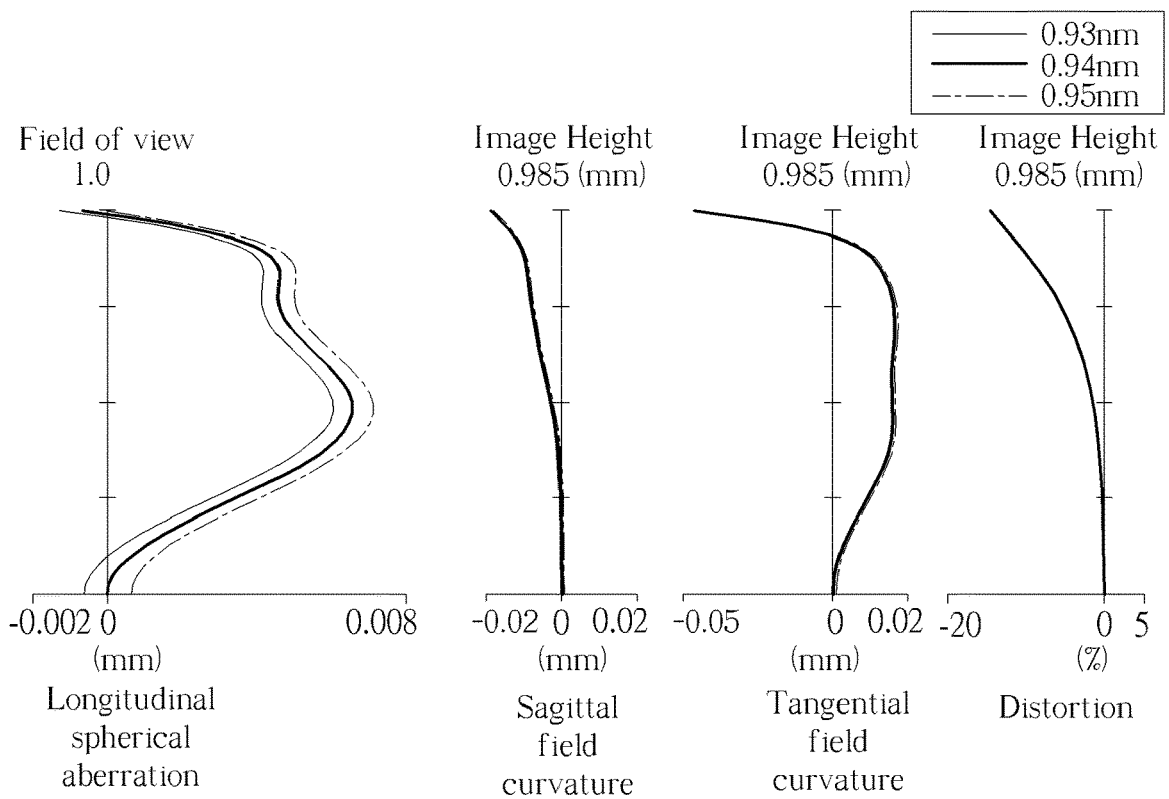
FIG. 25A illustrates the longitudinal spherical aberration on the image plane of the tenth embodiment.
FIG. 25B illustrates the field curvature aberration on the sagittal direction of the tenth embodiment.
FIG. 25C illustrates the field curvature aberration on the tangential direction of the tenth embodiment.
FIG. 25D illustrates the distortion aberration of the tenth embodiment.

Please refer to FIG. 24 which illustrates the tenth embodiment of the optical imaging lens 1 of the present invention. Please refer to FIG. 25A for the longitudinal spherical aberration on the image plane 71 of the tenth embodiment; please refer to FIG. 25B for the field curvature aberration on the sagittal direction; please refer to FIG. 25C for the field curvature aberration on the tangential direction, and please refer to FIG. 25D for the distortion aberration. The components in this embodiment are similar to those in the first embodiment, but the optical data such as the refracting power of a lens element, the radius, the lens thickness, the aspheric coefficient of a lens element or the back focus in this embodiment are different from the optical data in the first embodiment.

The optical data of the tenth embodiment of the optical imaging lens are shown in FIG. 44 while the aspheric surface data are shown in FIG. 45. In this embodiment, TTL=2.658 mm; EFL=1.504 mm; HFOV=37.500 degrees; the image height=0.985 mm; Fno=1.594. In particular, 1. TTL of the optical imaging lens in this example is shorter than that of the optical imaging lens in the first example, 2. the longitudinal spherical aberration and the field curvature aberration on the sagittal direction of the optical imaging lens in this embodiment are better than the longitudinal spherical aberration and the field curvature aberration on the sagittal direction of the optical imaging lens in the first embodiment, and 3. the fabrication of this embodiment is easier than that of the first embodiment so the yield is better.

Some important parameters and ratios in each embodiment are shown in FIG. 46 and in FIG. 47.

The applicants found that by the following designs to match with each other, the lens configuration in the embodiments of the present invention is able to effectively increase the field of view, to reduce the f-number, to reduce the optical imaging lens length, to enhance the sharpness of the object and to have good imaging quality:

1. The first lens element 10 has negative refracting power to go with that the periphery region 24 of the object-side surface 21 of the second lens element 20 is concave to facilitate receiving the light of a larger angle. The optical-axis region 33 of the object-side surface 31 of the third lens element 30 is concave, or the optical-axis region 43 of the object-side surface 41 of the fourth lens element 40 is convex, or the optical-axis region 46 of the image-side surface 42 of the fourth lens element 40 is concave, to facilitate the correction of the aberration which is caused by the first two lens elements (the first lens element 10 and the second lens element 20).

2. It is noted that the first lens element 10 has negative refracting power to go with that the periphery region 24 of the object-side surface 21 of the second lens element 20 is concave to more effectively meet the demand of the reduction of the length of the optical imaging lens. Together with any one of the following three features "the optical-axis region 33 of the object-side surface 31 of the third lens element 30 is concave", "the optical-axis region 43 of the object-side surface 41 of the fourth lens element 40 is convex" and "the optical-axis region 46 of the image-side surface 42 of the fourth lens element 40 is concave", the advantageous efficacy of good optical performance and of effective reduction of the length of the optical imaging lens which the present invention seeks is achieved. Moreover, if at least two of the features among the above three features co-exist, the advantageous efficacy which the present invention seeks may be more excellently exhibited.

In addition, it is further discovered that by controlling the following ratio ranges, it helps the designers to design an optical imaging lens of better optical performance, an effectively reduced total length and an effectively maintained or increased field of view:

a) In order to accomplish the advantageous efficacy of diminishing the total length of the optical imaging lens and of effectively maintaining or increasing the field of view, the embodiments of the present invention propose the solutions to properly reduce the lens thickness and the air gaps between adjacent lens elements. However, when the easiness of the assembly of the optical imaging lens and the imaging quality are taken into consideration, the lens thickness and the air gaps between the adjacent lens elements are required to go with one another. The following conditional ratio ranges help the satisfaction of better arrangement of the optical imaging lens:

1. $(G12+T2)/(T1+G23) \leq 2.500$, the preferable range is $0.500 \leq (G12+T2)/(T1+G23) \leq 2.500$, the more preferable range is $0.500 \leq (G12+T2)/(T1+G23) \leq 2.000$.
2. $TL/(T1+G23) \leq 5.500$, the preferable range is $3.000 \leq TL/(T1+G23) \leq 5.500$, the more preferable range is $3.000 \leq TL/(T1+G23) \leq 5.000$.
3. $TTL/(G23+T4) \leq 5.000$, the preferable range is $2.500 \leq TTL/(G23+T4) \leq 5.000$, the more preferable range is $2.500 \leq TTL/(G23+T4) \leq 4.500$.
4. $TL/(G23+T4) \leq 3.500$, the preferable range is $2.000 \leq TL/(G23+T4) \leq 3.500$.
5. $TTL/(T1+G23) \leq 5.500$, the preferable range is $3.500 \leq TTL/(T1+G23) \leq 5.500$.
6. $TL/T3 \leq 5.500$, the preferable range is $3.500 \leq TL/T3 \leq 5.500$.
7. $(G12+T2) \leq /(T1+G34) \leq 2.500$, the preferable range is $0.500 \leq (G12+T2) \leq /(T1+G34) \leq 2.500$, the more preferable range is $0.500 \leq (G12+T2) \leq /(T1+G34) \leq 2.000$.
8. $TL/(G34+T4) \leq 5.000$, the preferable range is $2.500 \leq TL/(G34+T4) \leq 5.000$, the more preferable range is $2.500 \leq TL/(G34+T4) \leq 4.000$.
9. $TL/(T1+G34) \geq 4.500$, the preferable range is $4.500 \leq TL/(T1+G34) \leq 6.000$.
10. $TL/T4 \leq 6.500$, the preferable range is $2.500 \leq TL/T4 \leq 6.500$, the more preferable range is $2.500 \leq TL/T4 \leq 5.500$.
11. $TTL/T1 \leq 8.000$, the preferable range is $6.000 \leq TTL/T1 \leq 8.000$.
12. $ALT/T1 \leq 5.600$, the preferable range is $4.000 \leq ALT/T1 \leq 5.600$.
13. $(G12+T2)/T1 \leq 2.500$, the preferable range is $0.500 \leq (G12+T2)/T1 \leq 2.500$.
14. $TTL/(G34+T4) \leq 4.500$, the preferable range is $3.000 \leq TTL/(G34+T4) \leq 4.500$.
15. $ALT/(G34+T4) \leq 3.000$, the preferable range is $2.000 \leq ALT/(G34+T4) \leq 3.000$.
16. $TTL/BFL \geq 5.000$, the preferable range is $5.000 \leq TTL/BFL \leq 7.500$.
17. $ALT/AAG \geq 4.000$, the preferable range is $4.000 \leq ALT/AAG \leq 7.000$.

b) An effective arrangement of the combination of the lens materials helps to correct the chromatic aberration of the entire optical system. The limiting combination of the selection of materials which satisfy the following conditional ratio ranges facilitates the purpose of the reduction of the length of the optical system and to obtain excellent optical imaging quality due to the larger refractive index to effectively help the light be quickly focused within a limited distance.

$\upsilon 1+\upsilon 2+\upsilon 3+\upsilon 4 \leq 150$, the preferable range is $80.000 \leq \upsilon 1+\upsilon 2+\upsilon 3+\upsilon 4 \leq 150.000$, the more preferable range is $80.000 \leq \upsilon 1+\upsilon 2+\upsilon 3+\upsilon 4 \leq 120.000$.

In the light of the unpredictability of the optical imaging lens, the present invention suggests the above principles to have a shorter total length of the optical imaging lens, a smaller Fno available, a maintained or increased field of view, enhanced imaging quality or a better fabrication yield to overcome the drawbacks of prior art.

In each one of the above embodiments, the longitudinal spherical aberration, the field curvature aberration and the distortion aberration all meet requirements in use. By observing the wavelengths of the near infrared (NIR), it is suggested that the off-axis light of different heights of every wavelength all concentrates on the image plane, and deviations of every curve also reveal that off-axis light of different heights are well controlled so the embodiments are capable of improving the spherical aberration, the field curvature aberration and the distortion aberration. In addition, by observing the imaging quality data, the distances amongst the three representing different wavelengths of the near infrared (930 nm, 940 nm, 950 nm) are pretty close to one another, it is suggested that the present invention is good at concentrating light of different wavelengths in kinds of conditions to have excellent capability of suppressing dispersion of light. Given the above, the present invention provides outstanding optical imaging quality in consideration of the optical data in each one the above embodiments.

When the optical imaging lens of the present invention is used in a waveband of the near infrared, it may serve as a night vision device of sensing infrared or as a pupil recognition device. The optical imaging lens of the present invention may also be used as a receiver in a 3D sensing device.

The ranges within the maximum (included) numeral values and minimum (included) numeral values derived from the combinations of the optical parameters disclosed in the embodiments of the invention may all be applicable and enable people skill in the pertinent art to implement the invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens, from an object side to an image side in order along an optical axis comprising: a first lens element, a second lens element, a third lens element and a fourth lens element, the first lens element to the fourth lens element each has an object-side surface facing toward the object side to allow imaging rays to pass through as well as an image-side surface facing toward the image side to allow the imaging rays to pass through, wherein:
   an optical-axis region of the object-side surface of the second lens element is convex, an optical-axis region of the image-side surface of the second lens element is concave and a periphery region of the image-side surface of the second lens element is convex;
   an optical-axis region of the image-side surface of the fourth lens element is concave; and
   the lens elements included by the optical imaging lens are only the four lens elements described above;
   wherein, TL is a distance from the object-side surface of the first lens element to the image-side surface of the fourth lens element along the optical axis, T1 is a thickness of the first lens element along the optical axis, T3 is a thickness of the third lens element along the optical axis and G34 is an air gap between the third lens element and the fourth lens element along the optical axis, and the optical imaging lens satisfies the relationships: $TL/T3 \leq 5.500$, an Abbe number of the second lens element equal to an Abbe number of the third lens element and $TL/(T1+G34) \geq 4.500$.

2. The optical imaging lens of claim 1, satisfying $TTL/(T1+G23) \leq 5.500$, wherein TTL is a distance from the object-side surface of the first lens element to an image plane along the optical axis, and G23 is an air gap between the second lens element and the third lens element along the optical axis.

3. The optical imaging lens of claim 1, satisfying (G12+T2)/T1≤2.500, wherein T2 is a thickness of the second lens element along the optical axis and G12 is an air gap between the first lens element and the second lens element along the optical axis.

4. The optical imaging lens of claim 1, satisfying ALT/T1≤5.600, wherein ALT is a sum of thicknesses of all the four lens elements along the optical axis.

5. The optical imaging lens of claim 1, satisfying υ1+υ2+υ3+υ4≤150.000, wherein υ1 is an Abbe number of the first lens element, υ2 is an Abbe number of the second lens element, υ3 is an Abbe number of the third lens element and υ4 is an Abbe number of the fourth lens element.

6. The optical imaging lens of claim 1, satisfying an Abbe number of the first lens element equal to an Abbe number of the third lens element.

7. The optical imaging lens of claim 1, satisfying a periphery region of the image-side surface of the first lens element being convex.

8. An optical imaging lens, from an object side to an image side in order along an optical axis comprising: a first lens element, a second lens element, a third lens element and a fourth lens element, the first lens element to the fourth lens element each has an object-side surface facing toward the object side to allow imaging rays to pass through as well as an image-side surface facing toward the image side to allow the imaging rays to pass through, wherein:
an optical-axis region of the image-side surface of the first lens element is concave and a periphery region of the image-side surface of the first lens element is convex;
an optical-axis region of the image-side surface of the second lens element is concave and a periphery region of the image-side surface of the second lens element is convex;
an optical-axis region of the object-side surface of the fourth lens element is convex; and
the lens elements included by the optical imaging lens are only the four lens elements described above;
wherein, TL is a distance from the object-side surface of the first lens element to the image-side surface of the fourth lens element along the optical axis, and T3 is a thickness of the third lens element along the optical axis, and the optical imaging lens satisfies a relationship: TL/T3≤5.500 and an Abbe number of the first lens element is equal to an Abbe number of the third lens element.

9. The optical imaging lens of claim 8, satisfying (G12+T2)/(T1+G34)≤2.500, wherein T1 is a thickness of the first lens element along the optical axis, T2 is a thickness of the second lens element along the optical axis, G12 is an air gap between the first lens element and the second lens element along the optical axis and G34 is an air gap between the third lens element and the fourth lens element along the optical axis.

10. The optical imaging lens of claim 8, satisfying TL/(T1+G23)≤5.500, wherein T1 is a thickness of the first lens element along the optical axis, and G23 is an air gap between the second lens element and the third lens element along the optical axis.

11. The optical imaging lens of claim 8, satisfying TTL/T1≤8.000, wherein TTL is a distance from the object-side surface of the first lens element to an image plane along the optical axis, and T1 is a thickness of the first lens element along the optical axis.

12. The optical imaging lens of claim 8, satisfying TL/T4≤6.500, wherein T4 is a thickness of the fourth lens element along the optical axis.

13. The optical imaging lens of claim 8, satisfying an optical-axis region of the object-side surface of the fourth lens element being convex.

14. The optical imaging lens of claim 8, satisfying the third lens element having positive refracting power.

15. An optical imaging lens, from an object side to an image side in order along an optical axis comprising: a first lens element, a second lens element, a third lens element and a fourth lens element, the first lens element to the fourth lens element each has an object-side surface facing toward the object side to allow imaging rays to pass through as well as an image-side surface facing toward the image side to allow the imaging rays to pass through, wherein:
an optical-axis region of the image-side surface of the second lens element is concave;
a periphery region of the object-side surface of the third lens element is convex;
the fourth lens element has negative refracting power and an optical-axis region of the object-side surface of the fourth lens element is convex; and
the lens elements included by the optical imaging lens are only the four lens elements described above;
wherein, TL is a distance from the object-side surface of the first lens element to the image-side surface of the fourth lens element along the optical axis, T4 is a thickness of the fourth lens element along the optical axis and G34 is an air gap between the third lens element and the fourth lens element along the optical axis, and the optical imaging lens satisfies a relationship: TL/(G34+T4)≤5.000.

16. The optical imaging lens of claim 15, satisfying (G12+T2)/(T1+G23)≤2.500, wherein T1 is a thickness of the first lens element along the optical axis, T2 is a thickness of the second lens element along the optical axis, G12 is an air gap between the first lens element and the second lens element along the optical axis and G23 is an air gap between the second lens element and the third lens element along the optical axis.

17. The optical imaging lens of claim 15, satisfying ALT/T1≤5.600, wherein ALT is a sum of thicknesses of all the four lens elements along the optical axis, and T1 is a thickness of the first lens element along the optical axis.

18. The optical imaging lens of claim 15, satisfying TL/T3≤5.500, wherein T3 is a thickness of the third lens element along the optical axis.

19. The optical imaging lens of claim 15, satisfying ALT/AAG≥4.000, wherein ALT is a sum of thicknesses of all the four lens elements along the optical axis, and AAG is a sum of three air gaps from the first lens element to the fourth lens element along the optical axis.

20. The optical imaging lens of claim 15, satisfying an optical-axis region of the image-side surface of the fourth lens element being concave.

* * * * *